US012750749B2

(12) United States Patent
Abedini et al.

(10) Patent No.: US 12,750,749 B2
(45) Date of Patent: Sep. 29, 2026

(54) MOBILITY OPTIMIZATION FOR NETWORK ENERGY SAVING

(71) Applicant: QUALCOMM Incorporated, San Diego, CA (US)

(72) Inventors: Navid Abedini, Basking Ridge, NJ (US); Naeem Akl, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 17/883,188

(22) Filed: Aug. 8, 2022

(65) Prior Publication Data

US 2024/0049088 A1 Feb. 8, 2024

(51) Int. Cl.
*H04W 36/16* (2009.01)
*H04W 52/02* (2009.01)

(52) U.S. Cl.
CPC ..... *H04W 36/165* (2013.01); *H04W 52/0203* (2013.01)

(58) Field of Classification Search
CPC ........... H04W 36/165; H04W 52/0203; H04W 52/0206; H04W 48/16; H04W 48/20; Y02D 30/70
See application file for complete search history.

(56) References Cited

U.S. PATENT DOCUMENTS

2009/0252073 A1* 10/2009 Kim .................. H04W 52/0241 455/450
2014/0328233 A1 11/2014 Shih et al.
2014/0341101 A1* 11/2014 Ganapathy ............ H04W 88/08 370/311
2014/0362750 A1* 12/2014 Song ................. H04W 36/0072 370/311
2016/0174150 A1* 6/2016 Comsa .................. H04W 72/04 370/329
2020/0351770 A1* 11/2020 Mackenzie ....... H04W 52/0206
(Continued)

OTHER PUBLICATIONS

Energy-Efficient Base-Stations Sleep-Mode Techniques in Green Cellular Networks: A Survey (Year: 2015).*
(Continued)

*Primary Examiner* — Yemane Mesfin
*Assistant Examiner* — Guoxing Fan
(74) *Attorney, Agent, or Firm* — Holland & Hart LLP/ QUALCOMM Incorporated

(57) ABSTRACT

Methods, systems, and devices for wireless communications are described. Some wireless communications systems may support mobility optimization for network energy saving. In some cases, user equipment (UE), operating in an idle or inactive mode, may receive an indication of an operation mode from a set of operation modes, where each network entity of a set of network entities is associated with an operation mode from the set of operation modes, including at least an energy saving mode and a baseline mode. The UE may calculate a set of values for each network entity based on the received indication and one or more parameters associated with the operation mode of a respective network entity. Additionally, the UE may select a network entity from the set of network entities based on each value of the set of values associated with the selected network entity being greater than one or more thresholds.

26 Claims, 15 Drawing Sheets

(56) References Cited

U.S. PATENT DOCUMENTS

| | | | | |
|---|---|---|---|---|
| 2021/0400545 | A1* | 12/2021 | Akl | H04W 36/0058 |
| 2023/0337137 | A1* | 10/2023 | Abotabl | H04W 52/0238 |

OTHER PUBLICATIONS

TS38.304 (Year: 2022).*

3GPP TS 36.331: "3rd Generation Partnership Project, Technical Specification Group Radio Access Network, Evolved Universal Terrestrial Radio Access (E-UTRA), Radio Resource Control (RRC), Protocol specification (Release 15)", 3rd Generation Partnership Project, Mobile Competence Centre, 650, Route Des Lucioles, F-06921 Sophia-Antipolis Cedex, France, vol. RAN WG2, No. V15.18.0, Jul. 17, 2022, pp. 1-966, XP052183732, pp. 414-417.

International Search Report and Written Opinion—PCT/US2023/069091—ISA/EPO—Oct. 20, 2023.

* cited by examiner

MOBILITY OPTIMIZATION FOR NETWORK ENERGY SAVING

FIELD OF TECHNOLOGY

The following relates to wireless communications, including mobility optimization for network energy saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support mobility optimization for network energy saving. Generally, the techniques described herein may enable a user equipment (UE), operating in an idle or inactive mode, to select a network entity from a set of network entities based on an operation mode of the selected network entity. For example, a UE may receive an indication of an operation mode from a set of operation modes, including at least an energy saving mode and a baseline mode, where each network entity of a set of network entities may be associated with at least one operation mode. In some cases, the set of operation modes may include a compensation mode. Additionally, the UE may calculate a set of values for each network entity based on the received indication and one or more parameters associated with the operation mode of the respective network entity. For example, the UE may calculate a first value of the set of values based on a first set of parameters from the one or more parameters and a second value of the set of values based on a second set of parameters from the one or more parameters. In some cases, the set of values may include a rank value associated with the respective network entity. Additionally, the UE may select the network entity from the set of network entities based on each value of the set of values associated with the selected network entity being greater than one or more thresholds. For example, the UE may select the network entity based on the first value of the set of values and the second value of the set of values being greater than zero. Additionally, or alternatively, the UE may select the network entity based on the set of values associated with the selected network entity being within an offset from a largest value of the set of values for each network entity of the set of network entities.

DETAILED DESCRIPTION

Figure 1:
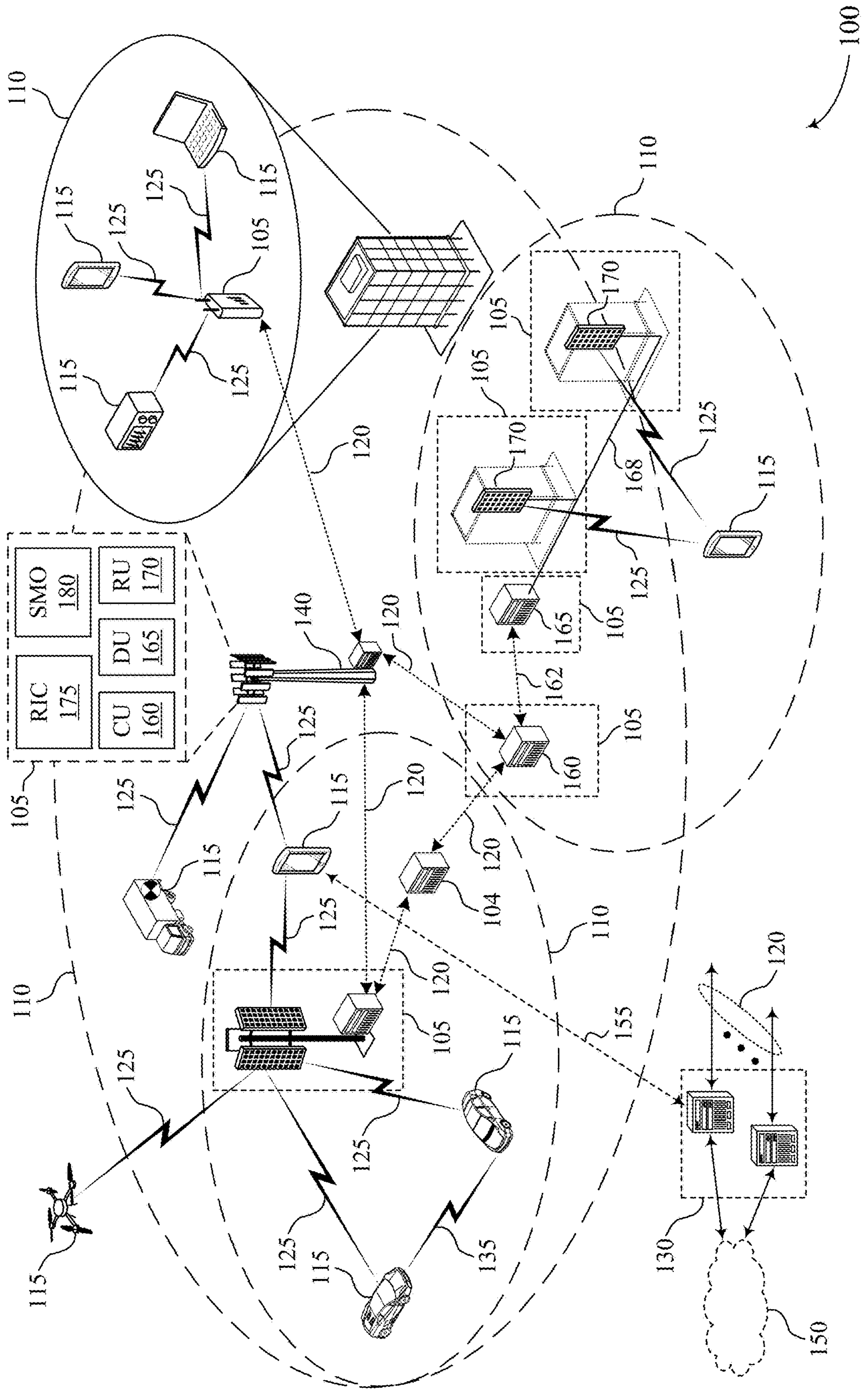
FIG. 1 illustrates an example of a wireless communications system that supports mobility optimization for network energy saving in accordance with one or more aspects of the present disclosure.

Some wireless communications systems may support wireless devices, such as user equipments (UEs), operating in one or more modes, including an idle or inactive mode. In some cases, a UE operating in an idle or inactive mode may select a network entity to camp on. That is, the UE may monitor system information transmitted by the selected network entity, perform one or more measurements of the selected network entity, and initiate communications with the selected network entity upon entering an active mode. In some cases, the UE may reselect a network entity to camp on. Additionally, network entities may operate in one or more operation modes. For example, a network entity may operate in an energy saving mode in which the network entity may attempt to reduce energy consumption, such as by reducing services provided by the network entity as compared to services provided by the network entity in a baseline mode, reducing coverage of the network entity as compared to services provided by the network entity in a baseline mode, or both. In another example, a network may operate in a compensation mode in which the network entity may attempt to compensate for one or more neighboring network entities operating in the energy saving mode, such as by increasing services provided by the network entity as compared to services provided by the network entity in a baseline mode, increasing coverage of the network entity as compared to services provided by the network entity in a baseline mode, or both. In some cases, a UE reselecting a network entity to camp on may be unaware of a mode of a network entity and may select a network entity to camp on that is in a mode which may not support capabilities of the UE.

Techniques described herein may enable a UE to select a network entity based on an operation mode of the network entity. For example, a UE may receive an indication of an operation mode of a network entity, where each network entity in a set of network entities is associated with an operation mode from a set of operation modes. In some cases, the set of operation modes may include an energy saving mode, a compensation mode, a baseline mode, or any combination thereof. Additionally, the UE may calculate a set of values associated with each network entity from the set of network entities based on the indication and one or more parameters associated with the operation mode of the respective network entity. For example, the set of values may include a value associated with a reception level of the respective network entity, a value associated with a quality level of a communication link with the respective network entity, a rank value, or any combination thereof. Further, the UE may select a network entity from the set of network entities based on the set of values associated with the selected network entity satisfying one or more threshold. For example, the UE may select the network entity based on the value associated with a reception level of the respective network entity and the value associated with a quality level of a communication link with the respective network entity being greater than zero. Additionally, or alternatively, the UE may select the network entity based on the rank value of the selected network entity being greater than a rank value of a network entity serving the UE. Selection of a network entity based on a mode of the network entity may result in increased network energy savings.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to mobility optimization for network energy saving.

FIG. 1 illustrates an example of a wireless communications system 100 that supports mobility optimization for network energy saving in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support mobility optimization for network energy saving as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the wireless communications system 100 may support mobility optimization for network energy saving. That is, the wireless communications system 100 may support UE 115 selection of a network entity 105 based on an operation mode of the network entity 105. For example, a UE 115 may receive an indication of an operation mode of a network entity 105, where each network entity 105 in a set of network entities 105 is associated with an operation mode from a set of operation modes. In some cases, the set of operation modes may include an energy saving mode, a compensation mode, a baseline mode, or any combination thereof. Additionally, the UE 115 may calculate a set of values associated with each network entity 105 based on the indication and one or more parameters associated with the operation mode of the respective network entity 105. For example, the set of values may include a value associated with a reception level of the respective network entity, a value associated with a quality level of a communication link with the respective network entity, a rank value, or any combination thereof. Further, the UE 115 may select a network entity 105 from the set of network entities 105 based on the set of values associated with the selected network entity 105 satisfying one or more threshold. For example, the UE 115 may select the network entity 105 based on the value associated with a reception level of the selected network entity 105 and the value associated with a quality level of a communication link with the selected network entity 105 being greater than zero.

Figure 2:
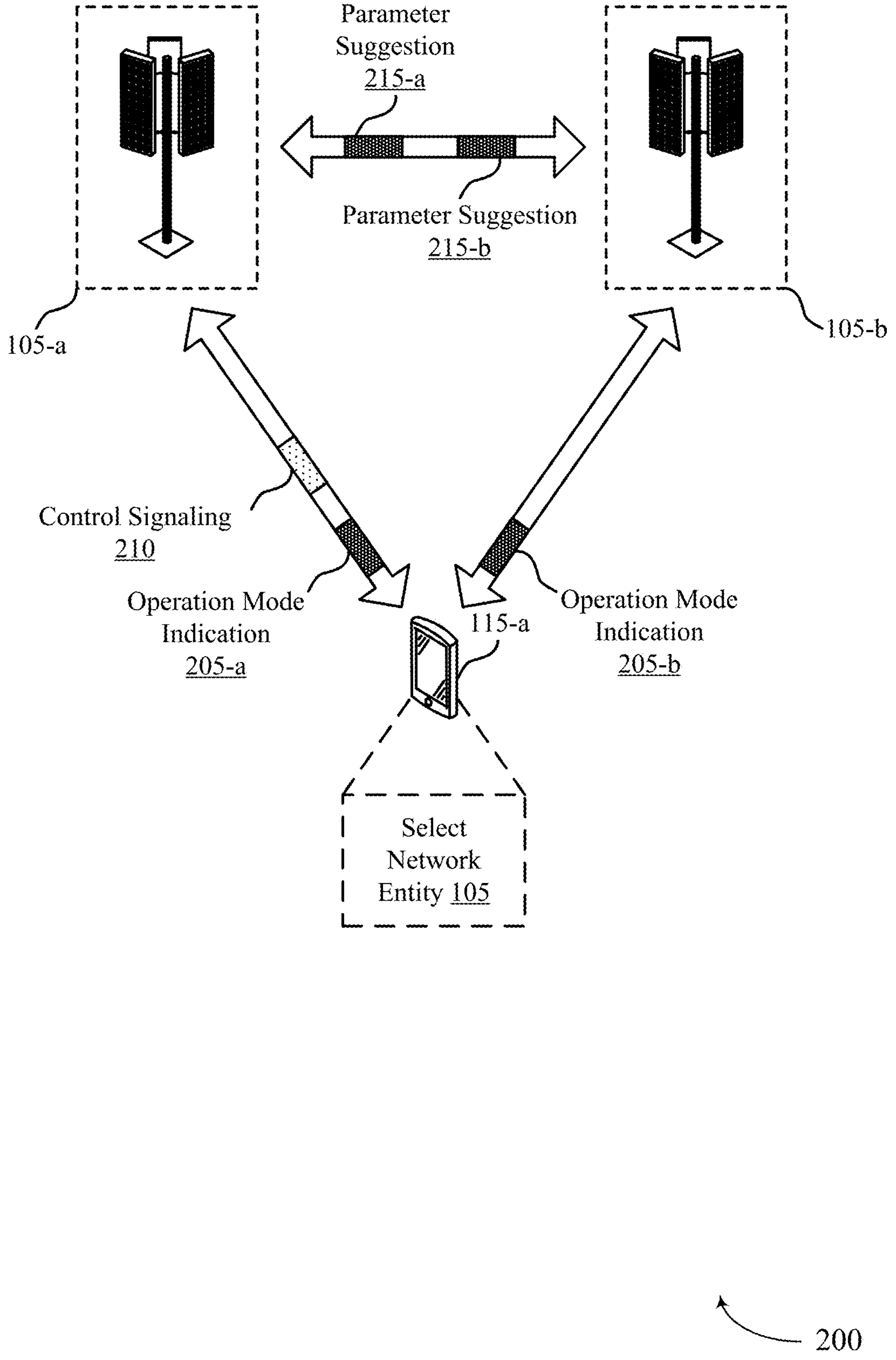
FIG. 2 illustrates an example of a wireless communication system that supports mobility optimization for network energy saving in accordance with one or more aspects of the present disclosure.

FIG. 2 illustrates an example of a wireless communications system 200 that supports mobility optimization for network energy saving in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-*a* and a network entity 105-*b*) and one or more UEs 115 (e.g., a UE 115-*a*), which may be examples of the corresponding devices described with reference to FIG. 1. In the example of FIG. 2, the network entity 105 a may be examples of a CU 160, a DU 165, an RU 170, a base station 140, an IAB node 104, or one or more other network nodes as described with reference to FIG. 1. In some cases, the UE 115-*a* may select a network entity 105 from the network entity 105-*a* and the network entity 105-*b* based on a set of calculated values associated with the selected network entity 105, where the set of calculated is based at least in part on an operation mode of the selected network entity 105.

Some wireless communications systems, such as the wireless communications systems 200, may support UEs 115, such as the UE 115-*a*, operating in one or more modes. In some cases, the one or more modes may include an idle mode or an inactive mode, in which a UE 115-*a* may search a set of network entities 105 (e.g., neighbor cells) and select a network entity 105 from the set of network entities 105 to camp on. That is, the UE 115-*a* may select a network entity 105 to monitor for system information while in the idle mode or inactive mode, such that, upon entering an active state, may communicate with the selected network entity. Additionally, the UE 115-*a* may perform one or more measurements of the selected network entity 105 such that the UE 115-*a* may reselect a network entity 105 from the set of network entities 105 based on changing conditions of or at the UE 115-*a*, the selected network 105, or both, resulting in on one or more measurements failing to satisfy a threshold.

Additionally, some wireless communications systems, such as the wireless communications systems 200, may support network entities 105 (e.g., cells), such as the network entity 105-*a* and the network entity 105-*b*, operating in one or more operation modes, including a baseline (e.g., normal) mode, an energy saving mode, and a compensation mode. For example, the network entity 105-*a* may operate according to the energy saving mode in which the network entity 105-*a* may reduce energy consumption of the network entity 105-*a*, such as by reducing services provided by the network entity 105-*a* as compared to services provided by the network entity 105-*a* in the baseline mode, reducing coverage of the network entity 105-*a* as compared to coverage provided by the network entity 105-*a* in the baseline mode, or both. As an illustrative example, the network entity 105-*a*, operating in an energy saving mode, may reduce a transmit power of one or more transmissions, reducing a coverage area of the network entity 105-*a* (e.g., compared to a coverage area of the network entity 105-*a* while operating in the baseline mode). In another example, the network entity 105-*b* may operate according to the compensation mode in which the network entity 105-*b* may attempt to compensate for one or more neighboring network entities 105, such as the network entity 105-*a*, operating in the energy saving mode, such as by increasing services provided by the network entity 105-*b* as compared to services provided by the network entity 105-*b* in the baseline mode, increasing coverage of the network entity 105-*b* as compared to coverage provided by the network entity 105-*b* in the baseline mode, or both. As an illustrative example, the network entity 105-*b*, operating in the compensation mode, may increase a transmit power of one or more transmissions, increasing a coverage area of the network entity 105-*b*, thus compensating for the reduction in the coverage area of the network entity 105-*a* (e.g., providing coverage to areas that lost coverage due to the network entity 105-*a* switching from the baseline mode to the energy saving mode).

However, in some cases, the UE 115-*a* may be unaware of an operation mode of a network entity 105, such that the UE 115-*a* may reselect a network entity 105 from the set of network entities 105 without consideration for the operation mode of the selected network entity 105. As such, the UE 115-*a* may select a network entity 105-*a* that may not support the UE 115-*a*. For example, the UE 115-*a* may be located at a position that within a coverage area of a network entity 105 operating according to the baseline mode and may select the network entity 105 to camp on. However, the selected network entity 105 may be operating according to the energy saving mode and may support a reduced coverage area compared to the coverage area of the network entity 105 operating according to the baseline mode, where the position of the UE 115-*a* is outside of the reduced coverage area. As such, the selected network entity 105 may change from the energy saving mode to the baseline mode to serve the UE 115-*a*, which may result in increased energy consumption, or the selected network entity 105 may be unable to serve the UE 115-*a* which may result in communication delays for the UE 115-*a*.

Accordingly, techniques described herein may enable a network entity 105, such as the network entity 105-*a* and the network entity 105-*b*, to transmit an indication of an operation mode associated with the network entity 105, which may enable a UE 115, such as the UE 115-*a*, to select a network entity 105 based on the operation mode. For example, each network entity 105 of multiple network entities 105, including the network entity 105-*a* and the network entity 105-*b*, may transmit an indication of an operation mode of the respective network entity 105, which may be referred to as an operation mode indication 205. That is, the network entity 105-*a* may transmit, to the UE 115-*a*, an operation mode indication 205-*a* and the network entity 105-*b* may transmit, to the UE 115-*a* an operation mode indication 205-*b*. Each operation mode indication 205 may include an indication of an operation mode from a set of operation modes, where the set of operation modes includes at least the energy saving mode and the baseline mode. In some cases, the set of operation modes may include the compensation mode.

In some cases, the network entities 105 may transmit the respective operation mode indication 205 via control signaling (e.g., semi-statically configured). In some other cases, the network entities 105 may transmit the respective operation mode indication 205 via system information (e.g., in a synchronization signal block (SSB) via a master information block (MIB), via a system information block, among other examples). For example, the network entity 105-*a* may transmit, to the UE 115-*a*, system information signaling including the operation mode indication 205-*a* (e.g., in an information element).

In some cases, each operation mode indication 205 may include an indication of one or more timers (e.g., via system information or a control message). That is, each operation mode indication 205 may include an indication of a time pattern associated with an operation mode of the respective network entity 105 such that the UE 115-*a* may determine an operation mode of a network entity 105 based on the one or more timers. For example, the network entity 105-*b* may transmit the operation mode indication 205-*b* indicating a first timer associated with the compensation mode and a second timer associated with the energy saving mode. Additionally, the operation mode indication 205-*b* may indicate to the UE 115-*a* that the network entity 105-*b* may operate according to the compensation mode for a first duration based on the first timer and, upon expiration of the first timer, may operate according to the energy saving mode for a second duration based on the second timer. As such, upon receiving the operation mode indication 205-*b*, the UE 115-*a* may initiate the first timer and, upon expiration of the first timer, initiate the second timer (e.g., continuing to switch between the timers cyclically). Thus, the UE 115-*a* may determine the operation mode of the network entity 105-*b* at a given instance based on which timer is running.

In some cases, each operation mode indication 205 may be an implicit indication of the operation mode of a respective network entity 105. For example, each operation mode of the set of operation modes may be associated with a frequency (e.g., for inter-frequency cell reselection). That is, a first frequency (e.g., carrier frequency) may be associated with a first operation mode, such as the energy saving mode, and a second frequency may be associated with a second operation mode, such as the compensation mode. As such, a network entity 105 may transmit signaling, such as system information signaling, via a frequency associated with an operation mode of the network entity 105. For example, the network entity 105-*a* may broadcast system information signaling (e.g., SIB1/2/3/4) via the first carrier frequency, and the UE 115-*a* may determine the network entity 105-*a* is associated with the energy saving mode based on the first frequency. Additionally, or alternatively, the operation mode indication 205 (e.g., included in the system information) may include an indication of an operation mode associated with a carrier frequency in which the operation mode indication 205 was transmitted (e.g., indicated via InterFreqCarrerFreqInfo). For example, the network entity 105-*b* may transmit the operation mode indication 205-*b* via the second frequency and the operation mode indication 205-*b* may include an indication of the compensation mode, such that the UE 115-*a* may determine that network entities 105 operating via the second frequency may be associated with the compensation mode.

Additionally, the UE 115-*a* may calculate a set of values associated with each network entity 105 based on the operation mode associated with the respective network entity 105 and one or more parameters associated with the operation mode (e.g., mode dependent parameters). That is, a first set of one or more parameters may be associated with the energy saving mode, a second set of parameters may be associated with the compensation mode, and a third set of parameters may be associated with the baseline mode. In some cases, each set of one or more parameters associated with an operation mode may include a reception level metric associated with the operation mode (e.g., $Q_{RXLevMin}$), a quality metric associated with the operation mode (e.g. $Q_{QualMin}$), a hysteresis value associated with the operation mode ($Q_{Hyst}$), one or more offsets associated with the operation mode (e.g. $Q_{offset}$, $Qoffset_{MODE}$, or both), one or more priority values associated with the operation mode (e.g., cellReselectionPrioray and cellReselectionSubPriority), one or more timers associated with the operation mode (t-ReselectionNR and t-ReselectionNR-SF), or any combination thereof.

In some cases, the UE 115-*a* may receive control signaling 210 indicating the first set of one or more parameters, the second set of one or more parameters, the third set of one or more parameters, or any combination thereof. Additionally, or alternatively, the network entity 105-*a* and the network entity 105-*b* may coordinate parameter selection (e.g., configuration) via a backhaul communication link. For example, the network entity 105-*a* may transmit, to the network entity 105-*b*, a parameter suggestion 215-*a*. In some cases, the parameter suggestion 215-*a* may include an indication of one or more suggested parameters for the first set of one or more parameters associated with the energy saving mode, an indication of one or more suggested parameters for the second set of one or more parameters associated with the compensation mode (e.g., an operation mode of a neighboring cell), an indication of one or more suggested parameters for the third set of one or more parameters associated with the baseline mode, or any combination thereof (e.g., to support inter-DU and/or over-the-air (OTA) coordination). Additionally, or alternatively, the network entity 105-*b* may transmit, to the network entity 105-*a*, a parameter suggestion 215-*b*.

In some cases, the UE 115-*a* may determine a first value of the set of values, which may be referred to as $S_{RXLev}$, associated with each network entity 105 according to the following Equation 1:

$$S_{RXLev}=Q_{RXLevMeas}-(Q_{RXLevMin}+Q_{RXLevMinOffset})-P_{compensation}-Qoffset_{Temp} \tag{1}$$

where the parameter $S_{RXLev}$ may represent a reception level metric associated with the respective network entity 105, $Q_{RXLevMeas}$ may represent a reception level metric measured based on the respective network entity 105, $Q_{RXLevMin}$ may represent a reception level metric based on an operation mode associated with the respective network entity 105 (e.g., $Q_{RXLevMin}$ associated with the energy saving mode may be greater than $Q_{RXLevMin}$ associated with the compensation mode), $Q_{RXLevMinOffset}$ may represent a threshold (e.g., minimum) reception level metric based on the respective network entity 105, $P_{compensation}$ may represent an additional offset based on the TX power configuration and the frequency range associated with the respective network entity 105, and $Qoffset_{Temp}$ may represent a temporary offset applied to the respective network entity 105, when there may be a connection establishment failure.

In some cases, the UE 115-*a* may determine a second value of the set of values, which may be referred to as $S_{Qual}$, associated with each network entity 105-*a* according to the following Equation 2:

$$S_{Qual}=Q_{QualMeas}-(Q_{QualMin}+Q_{QualMinOffset})-Qoffset_{Temp} \tag{2}$$

where the parameter $S_{Qual}$ may represent a quality metric associated with the respective network entity 105, $Q_{QualMeas}$ may represent a quality metric measured based on the respective network entity 105, $Q_{QualMin}$ may represent a quality metric based on an operation mode associated with the respective network entity 105 (e.g., $Q_{QualMin}$ associated with the energy saving mode may be greater than $Q_{QualMin}$ associated with the compensation mode), $Q_{QualMinOffset}$ may represent a threshold (e.g., minimum) quality metric based on the respective network entity 105, and $Qoffset_{Temp}$ may represent the temporary offset applied to the respective network entity 105, when there may be a connection establishment failure. (e.g., as in Equation 1).

In some cases, the UE 115-*a* may determine a third value of the set of values, which may be referred to as a rank, associated with each network entity 105 according to the following Equation 3:

$$R_s = RSRP_s + Q_{Hyst} - \text{Qoffset}_{Temp}$$

$$R_n = RSRP_n - Q_{Offset} - \text{Qoffset}_{Temp} \quad (3)$$

where the parameter $R_s$ may represent a rank of a network entity 105 serving the UE 115-*a* (e.g., serving cell rank), $R_n$ may represent a rank of a network entity 105 neighboring the UE 115-*a* (e.g., neighbor cell rank), RSRP s may represent a reference signal receive power (RSRP) associated with the network entity 105 serving the UE 115-*a*, $RSRP_n$ may represent an RSRP associated with the network entity 105 neighboring the UE 115-*a* $Q_{Hyst}$ may represent a hysteresis value associated with an operation mode of the network entity 105 serving the UE 115-*a* (e.g., $Q_{Hyst}$ associated with the compensation mode may be greater than $Q_{Hyst}$ associated with the energy saving mode), $Qoffset_{Temp}$ may represent the temporary offset applied to the respective network entity 105, when there may be a connection establishment failure. (e.g., as in Equations 1 and 2), and $Q_{Offset}$ may be represent an offset based on the mode associated with the respective network entity 105 (e.g. $Q_{Offset}$ associated with the energy saving mode may be greater than $Q_{Offset}$ associated with the compensation mode).

In some cases, an additional offset (e.g., $Qoffset_{ES}$ or $Qoffset_{COMP}$), which may be referred to a $Qoffset_{MODE}$ in the context of this application, may be applied to $S_{RXLev}$, $S_{Qual}$, $R_s$, $R_n$, or any combination thereof, based on the mode associated with the respective network entity 105. In some cases, a $QOffset_{MODE}$ associated with the compensation mode, which may be referred to as a $QOffset_{COMP}$, may be equal in value to an inverse of a value of a $QOffset_{MODE}$ associated with the energy saving mode, which may be referred to as a $QOffset_{ES}$ (e.g., a single $QOffset_{ES}$ may be configured).

In some examples, a common $Qoffset_{MODE}$ may be applied to $S_{RXLev}$, $S_{Qual}$, $R_s$, $R_n$, or any combination thereof. That is, the $Qoffset_{MODE}$ in each equation for a respective network entity 105 may be the same value. In some examples, $Qoffset_{MODE}$ may be different for $S_{RXLev}$, $S_{Qual}$, $R_s$, $R_n$, or any combination thereof. That is, the $Qoffset_{MODE}$ in each equation may be different values for a respective network entity 105. In some cases, $Qoffset_{MODE}$ may be network entity 105 specific (e.g., cell specific), frequency specific (e.g., common to cells on a given carrier frequency), common (e.g., applicable to any cell on any frequency), or any combination thereof (e.g., each offset may be configured differently in SIB 1/2/3/4, dedicated RRC, or both). That is, $Qoffset_{MODE}$ may be an effective offset that is a sum of multiple offset values according to the following Equation 4:

$$\text{Qoffset}_{MODE} = \text{QOffset}_{common} + \text{Qoffset}_{Freq} + \text{Qoffset}_{Cell} \quad (4)$$

where the parameter $Qoffset_{Common}$ may represent a common offset, the parameter $Qoffset_{Freq}$ may represent a frequency specific offset, and the parameter $Qoffset_{Cell}$ may represent a network entity 105 (e.g., cell) specific offset.

In some cases, the UE 115-*a* may select the network entity 105-*a* or the network entity 105-*b* based on respective values of $S_{RXLev}$ and $S_{Qual}$ being greater than zero (e.g., positive integer values). In some cases, one or more network entities 105 may be included in a blacklist or a whitelist, based on their associated operation mode. That is, the UE 115-*a* may refrain from selecting a network entity 105 on a blacklist and may select a network entity 105 on a whitelist.

In some cases, the UE 115-*a* may select a network entity 105 from multiple network entities 105 based on a rank value associated with the network entity 105 being within an offset (e.g., rangeToBestCell, rangeToBestCell-ES, or rangeToBestCell-COMP) from a highest rank value associated with the multiple network entities 105 (e.g., to incentivize/de-incentivize selecting a cell in an energy saving mode or a compensation mode). That is, the UE 115-*a* may receive control signaling indicating for the UE 115-*a* to select a network entity 105 associated with an indicated mode and indicating for the UE 115-*a* to select the network entity 105 based on a rank value associated with the network entity 105 being within an indicated offset from a highest rank value associated with the multiple network entities 105. For example, the UE 115-*a* may rank multiple network entities 105 from largest to smallest value based on respective rank values (e.g., calculated according to Equation 3) and may select a network entity 105 from the multiple network entities 105 associated with the compensation mode whose respective rank is within an offset of the highest (e.g., largest) rank value (e.g., best cell). In another example, the UE 115-*a* may refrain from selecting a network entity 105 from multiple network entities 105 associated with the energy saving mode whose respective rank is within an offset of the highest rank value (e.g., there are cells not in the energy saving mode whose rank is within rangeToBestCell of the best cell or within rangeToBestCell of a cell in the energy saving mode).

In some cases, the UE 115-*a* may select a network entity 105 based a frequency associated with the network entity 105. For example, the UE 115-*a* may receive control signaling that indicates a parameter associated with frequency-specific network entity selection (e.g., cellReselectionPriority, cellReselectionSubPriority, t-ReselectionNR, or t-ReselectionNR-SF). That is, the parameter may indicate (e.g., incentivize) for the UE 115-*a* to select a network entity 105-*a* from an indicated frequency (e.g., based on the mode associated with the frequency). In some cases, one or more priority offsets may be applied to the parameter associated with frequency-specific network entity selection (e.g., an additional common offset, frequency specific offset, cell specific offset, or any combination thereof may be defined to be added to the priority/sub-priority of a carrier frequency). In some cases, a first priority offset may be associated with the compensation and a second priority offset may be associated with the energy saving. Additionally, or alternatively, a value of the first priority offset may be equal to an inverse of a value of the second priority offset (e.g., COMP priority offset is equal to −1*ES priority offset). For example, the parameter may indicate for the UE 115-*a* to select a network entity 105 associated with the second frequency. As such, the UE 115-*a* may select the network entity 105-*b* based on identifying that the network entity 105-*b* is associated with the second frequency. In some cases, the UE 115-*a* may identify a frequency associated with a network entity 105 based on one or more measurements of the network entity 105, signaling received from the network entity 105, or any combination thereof.

Figure 3:
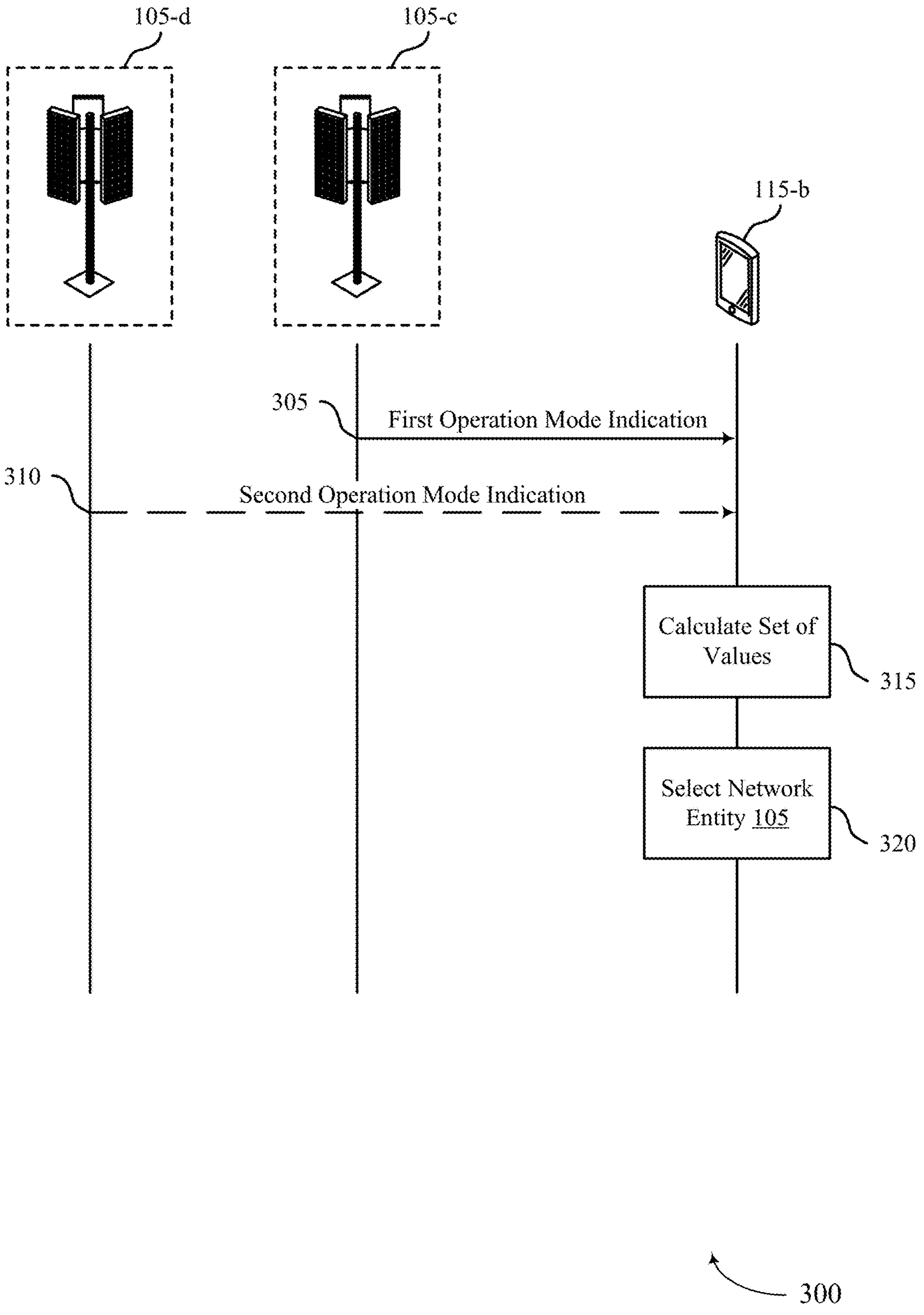
FIG. 3 illustrates an example of a process flow that supports mobility optimization for network energy saving in accordance with one or more aspects of the present disclosure.

FIG. 3 illustrates an example of a process flow 300 that supports mobility optimization for network energy saving in accordance with one or more aspects of the present disclosure. In some examples, the process flow 300 may implement or be implemented by aspects of the wireless communications system 100 and the wireless communications system 200. For example, the process flow 300 may include one or more network entities 105 (e.g., a network entity 105-*c* and a network entity 105-*d*) and one or more UEs 115 (e.g., a UE 115-*b*), which may be examples of the corresponding devices described with reference to FIG. 1. In the example of FIG. 3, the network entity 105-*a* may be examples of a CU 160, a DU 165, an RU 170, a base station 140, an IAB node 104, or one or more other network nodes as described with reference to FIG. 1. For example, the UE 115-*b* may select a network entity 105, from the network entity 105-*c* and the network entity 105-*d,* based on a calculated set of value associated with the selected network entity 105.

At 305, the UE 115-*b*, operating in an idle or inactive mode, may receive, from the network entity 105-*c*, a first indication of an operation mode from a set of operation modes, where the set of modes includes at least an energy saving mode and a baseline mode. In some cases, the set of modes may include a compensation mode. For example, the network entity 105-*c* may be associated with the compensation mode. In some cases, the UE 115-*b* may receive the first indication of the compensation mode at a first frequency, where the first frequency is associated with the compensation mode. In some cases, the UE 115-*b* may receive a control message including the first indication. In some other cases, the UE 115-*b* may receive system information including the first indication. In some other cases, the UE 115-*b* may receive an indication of a first timer associated with the compensation mode, such that the UE 115-*b* may determine the network entity 105-*c* is associated with an compensation mode based on the first timer.

In some cases, at 310, the UE 115-*b* may receive, from the network entity 105-*d*, a second indication of an operation mode from the set of operation modes. For example, the network entity 105-*d* may be associated with the energy saving mode. In some cases, the UE 115-*b* may receive the second indication of the energy saving mode at a second frequency, where the second frequency is associated with the energy saving mode. In some cases, the UE 115-*b* may receive a control message including the second indication. In some other cases, the UE 115-*b* may receive system information including the second indication. In some other cases, the UE 15-*b* may receive an indication of a second timer associated with the energy saving mode, such that the UE 115-*b* may determine the network entity 105-*d* is associated with the energy saving mode based on the second timer.

At 315, the UE 115-*b* may calculate a set of values for each network entity 105 based on the respective indication and one or more parameters associated with the operation mode of the respective network entity 105. In some cases, the UE 115-*b* may receive, from the network entity 105-*c*, the network entity 105-*d*, or both, an indication of the one or more parameters associated with each operation mode. The one or more parameters may include one or more parameters associated with a reception level of the respective network entity 105, one or more parameters associated with a quality of the respective network entity 105, one or more offset values, a compensation values, a hysteresis value, one or more cell reselection priority values, or any combination thereof. For example, the UE 115-*a* my calculate a first set of values associated with the network entity 105-*c* based on one or more parameters associated with the compensation mode and a second set of values associated with the network entity 105-*d* based on one or more parameters associated with the energy saving mode. In some cases, a first value of the set of values may be associated with a reception level of the respective network entity 105, a second value of the set of values may be associated with a quality of the communication link of the respective network entity 105, and a third value of the set of values may be associated with a rank of the respective network entity 105.

At 320, the UE 115-*b* may select a network entity 105 from the network entity 105-*a* and the network entity 105-*b* based on each value of the set of values associated with the selected network entity 105 being greater than one or more thresholds. In some cases, the UE 115-*b* may select the network entity 105 from the network entity 105-*a* and the network entity 105-*b* based on the first value of the set of values associated with the selected network entity 105 and the second value of the set of values associated with the selected network entity 105 being greater than zero (e.g., a first threshold). For example, the UE 115-*b* may select the network entity 105-*c* based on first value of the first set of values associated with the network entity 105-*c* and the second value of the first set of values associated with the selected network entity 105-*c* being greater than zero. Alternatively, the UE 115-*b* may refrain from selecting the network entity 105-*d* based on first value of the second set of values associated with the network entity 105-*d* being greater than zero and the second value of the second set of values associated with the selected network entity 105-*d* being less than zero.

Additionally, or alternatively, the UE 115-*b* may select the network entity 105 from the network entity 105-*a* and the network entity 105-*b* based on the set of values for the selected network entity 105 being within an offset from a largest value of the set of values for each network entity 105 from the network entity 105-*a* and the network entity 105-*b* (e.g., second threshold). For example, a first rank value from the first set of values associated with the network entity 105-*c* may be less than a second rank value the second set of values associated with the network entity 105-*d*. However, the one or more parameters may include a parameter indicating that the UE 115-*b* is to select a network entity 105 associated with the compensation mode that is further associated with a rank value within the offset from the largest rank value of the rank values associated with the multiple network entities 105. As such, the UE 115-*a* may select the network entity 105-*a* based on the network entity 105-*c* being associated with the compensation mode and the first rank value being within the offset.

Figure 4:
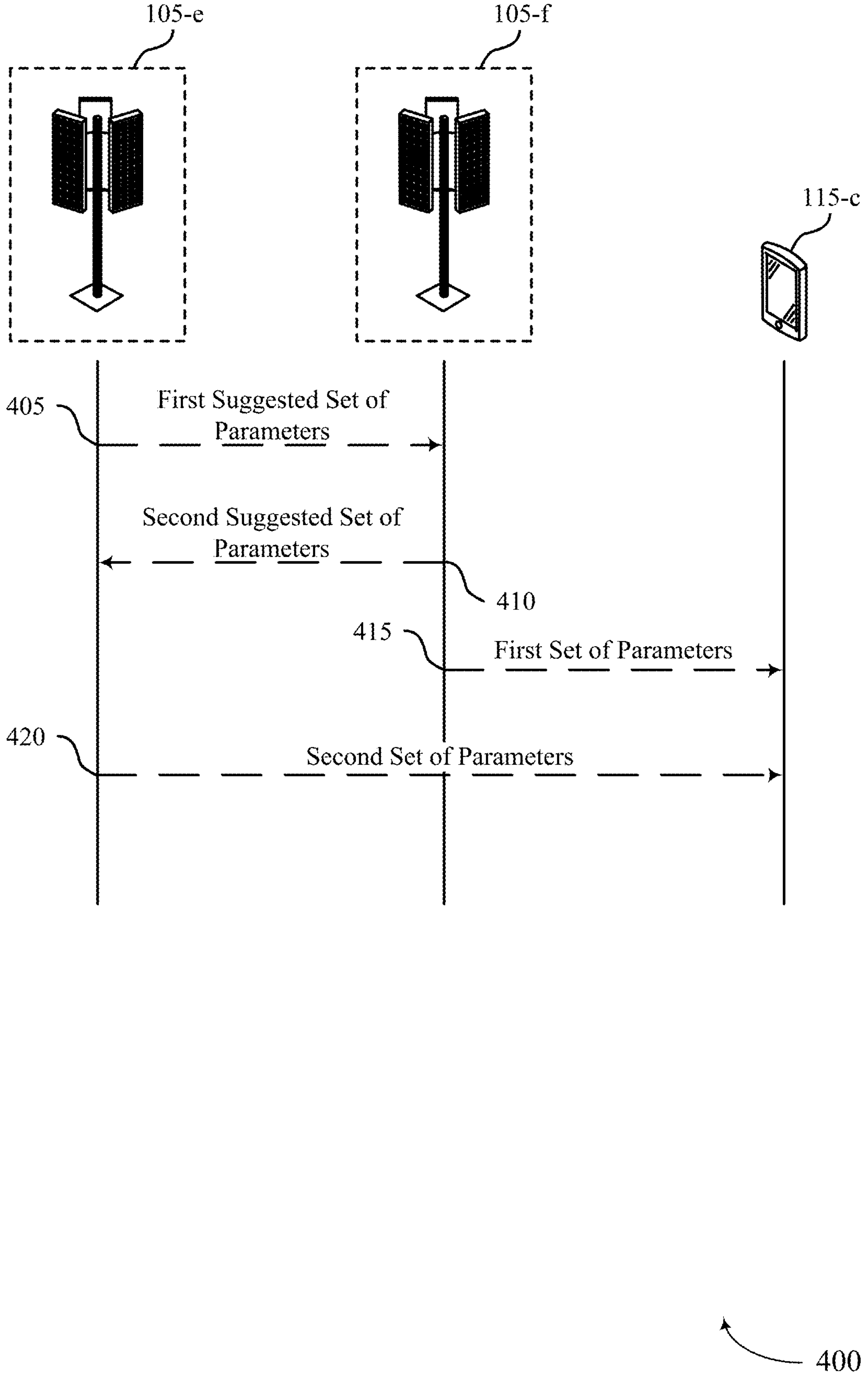
FIG. 4 illustrates an example of a process flow that supports mobility optimization for network energy saving in accordance with one or more aspects of the present disclosure.

FIG. 4 illustrates an example of a process flow 400 that supports mobility optimization for network energy saving in accordance with one or more aspects of the present disclosure. In some examples, the process flow 400 may implement or be implemented by aspects of the wireless communications system 100, the wireless communications system 200, and the process flow 300. For example, the process flow 400 may include one or more network entities 105 (e.g., a network entity 105-*e* and a network entity 105-*f*) and one or more UEs 115 (e.g., a UE 115-*c*), which may be examples of the corresponding devices described with reference to FIG. 1. In the example of FIG. 4, the network entity 105 a may be examples of a CU 160, a DU 165, an RU 170, a base station 140, an IAB node 104, or one or more other network nodes as described with reference to FIG. 1. For example, the network entity 105-*e* may transmit, to the network entity 105-*f*, an indication of a first suggested set of parameters associated with an operation mode.

In some cases, at 405, the network entity 105-*e* may transmit, to the network entity 105-*f* via a backhaul communication link, an indication of a first suggested set of parameters associated with at least one operation mode. For example, the network entity 105-*e* may be associated with an energy saving mode such that the first suggested set of parameters may include one or more parameters associated with the energy saving mode. In another example, the network entity 105-*e* may be associated with the energy saving mode such that the first set of suggested parameters may be associated with the compensation mode. That is, the network entity 105-*e* may suggest a set of parameters for the compensation mode based on a set of parameters associated with the energy saving mode selected by the network entity 105-*e*. In another example, the first set of suggested parameters may include one or more parameters associated with the energy saving mode and one or more parameters associated with the compensation mode.

In some cases, at 410, the network entity 105-*f* may transmit, to the network entity 105-*e* via a backhaul communication link, an indication of a second suggested set of parameters associated with at least one operation mode. For example, the network entity 105-*f* may be associated with the compensation mode such that the second suggested set of parameters may include one or more parameters associated with the compensation mode. In another example, the network entity 105-*f* may be associated with the compensation mode such that the second set of suggested parameters may be associated with the energy saving mode. That is, the network entity 105-*f* may suggest a set of parameters for the energy saving mode based on a set of parameters associated with the compensation mode selected by the network entity 105-*f*. In another example, the second set of suggested parameters may include one or more parameters associated with the energy saving mode and one or more parameters associated with the compensation mode.

In some cases, at 415, the network entity 105-*f* may broadcast, to a UE 115-*c*, an indication of the first suggested set of parameters associated with the at least one operation mode.

In some cases, at 420, the network entity 105-*e* may broadcast, to the UE 115-*c*, an indication of the second suggested set of parameters associated with the at least one operation mode.

Figure 5:
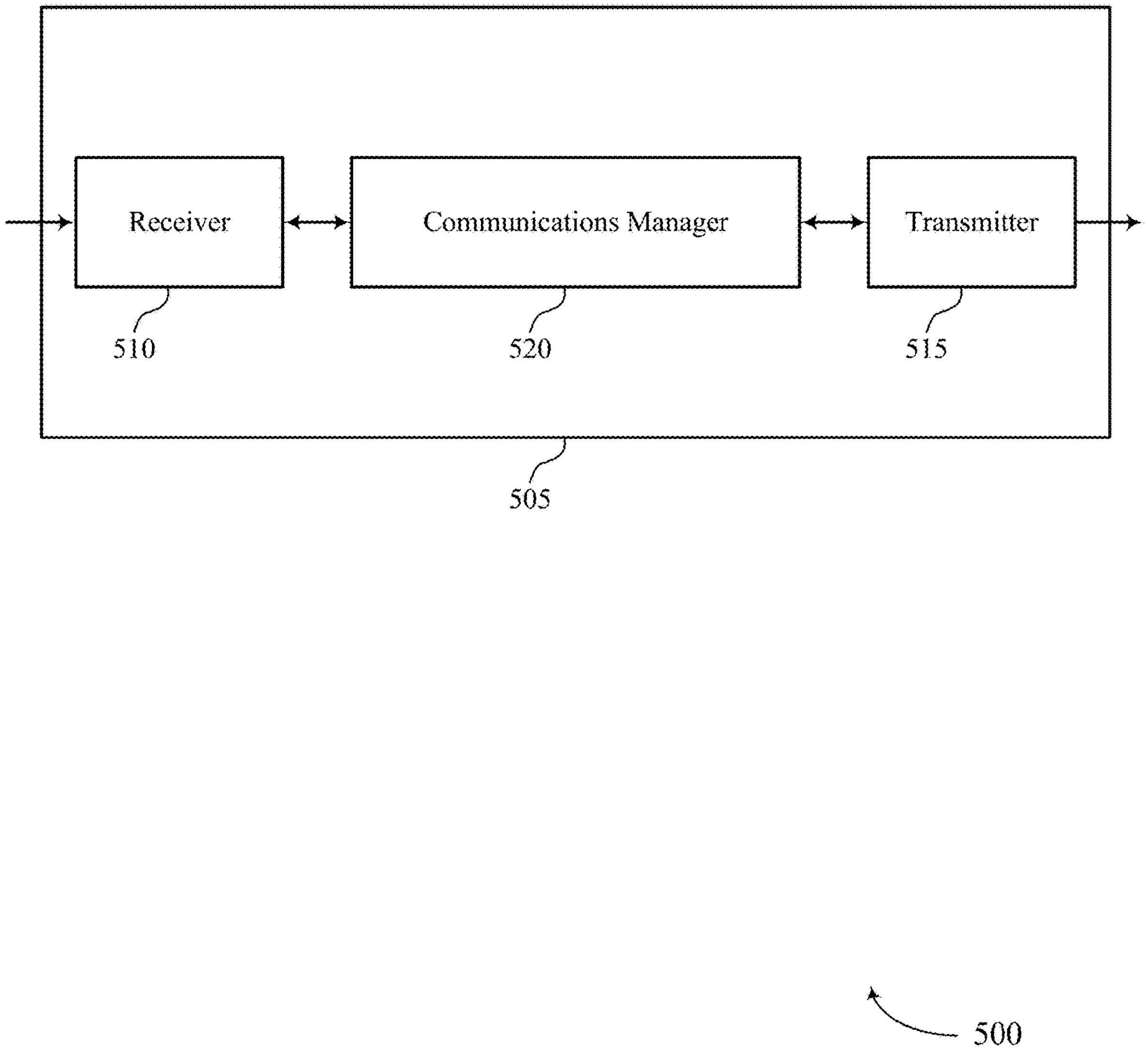
FIGS. 5 and 6 show block diagrams of devices that support mobility optimization for network energy saving in accordance with one or more aspects of the present disclosure.

FIG. 5 shows a block diagram 500 of a device 505 that supports mobility optimization for network energy saving in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to mobility optimization for network energy saving). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to mobility optimization for network energy saving). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of mobility optimization for network energy saving as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE operating in an idle or inactive mode in accordance with examples as disclosed herein. For example, the communications manager 520 may be configured as or otherwise support a means for receiving an indication of an operation mode from among a set of multiple operation modes, where each network entity of a set of multiple network entities is associated with at least one operation mode of the set of multiple operation modes, the set of multiple operation modes including at least an energy saving mode and a baseline mode. The communications manager 520 may be configured as or otherwise support a means for calculating a set of values for each network entity of the set of multiple network entities based on the received indication and one or more parameters associated with the operation mode of a respective network entity. The communications manager 520 may be configured as or otherwise support a means for selecting a network entity from the set of multiple network entities based on each value of the set of values associated with the selected network entity being greater than one or more thresholds.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for mobility optimization for network energy saving which may result in reduced processing, reduced power consumption, and more efficient utilization of communication resources, among other advantages.

Figure 6:
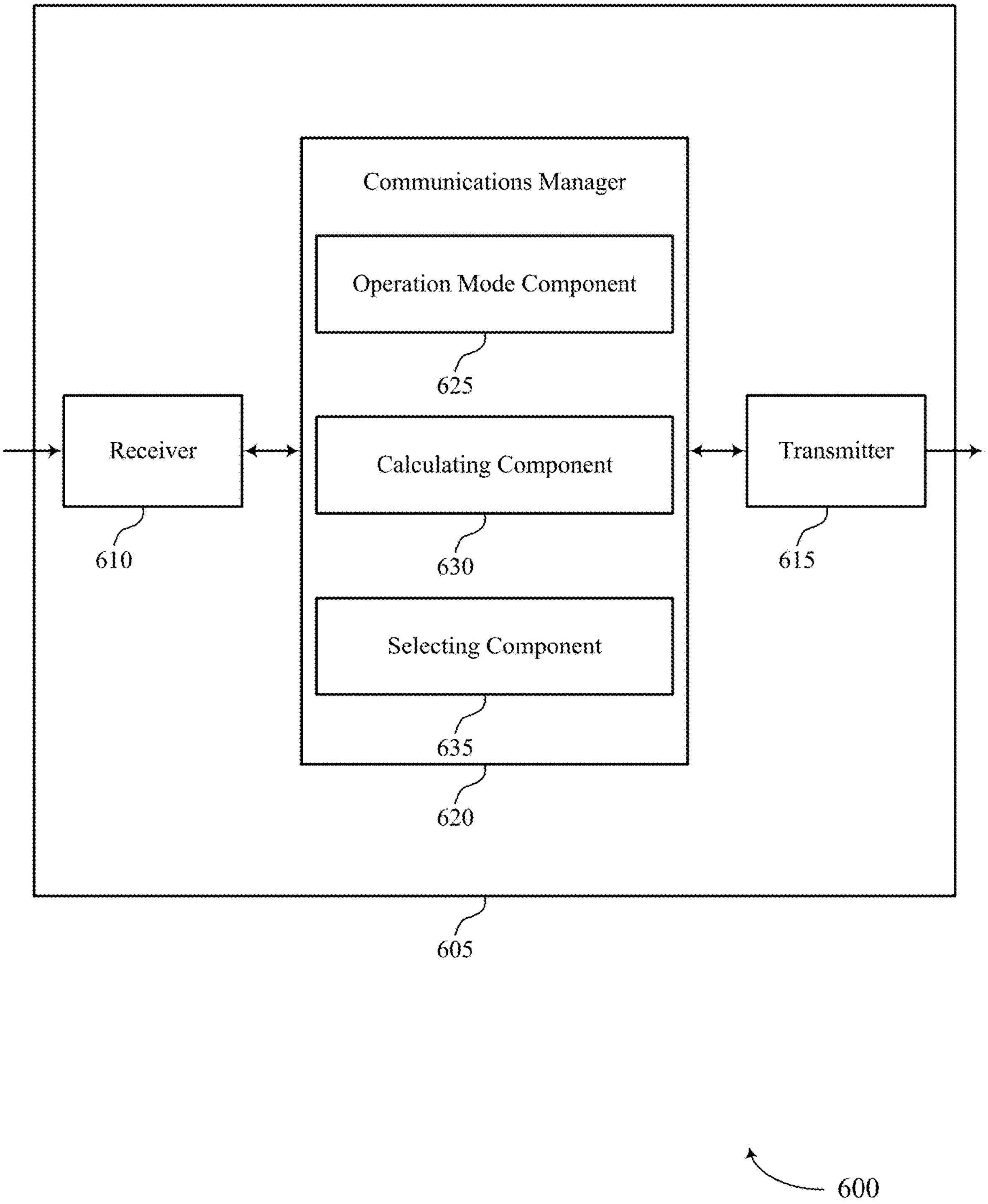

FIG. 6 shows a block diagram 600 of a device 605 that supports mobility optimization for network energy saving in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to mobility optimization for network energy saving). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to mobility optimization for network energy saving). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of mobility optimization for network energy saving as described herein. For example, the communications manager 620 may include an operation mode component 625, a calculating component 630, a selecting component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE operating in an idle or inactive mode in accordance with examples as disclosed herein. The operation mode component 625 may be configured as or otherwise support a means for receiving an indication of an operation mode from among a set of multiple operation modes, where each network entity of a set of multiple network entities is associated with at least one operation mode of the set of multiple operation modes, the set of multiple operation modes including at least an energy saving mode and a baseline mode. The calculating component 630 may be configured as or otherwise support a means for calculating a set of values for each network entity of the set of multiple network entities based on the received indication and one or more parameters associated with the operation mode of a respective network entity. The selecting component 635 may be configured as or otherwise support a means for selecting a network entity from the set of multiple network entities based on each value of the set of values associated with the selected network entity being greater than one or more thresholds.

Figure 7:
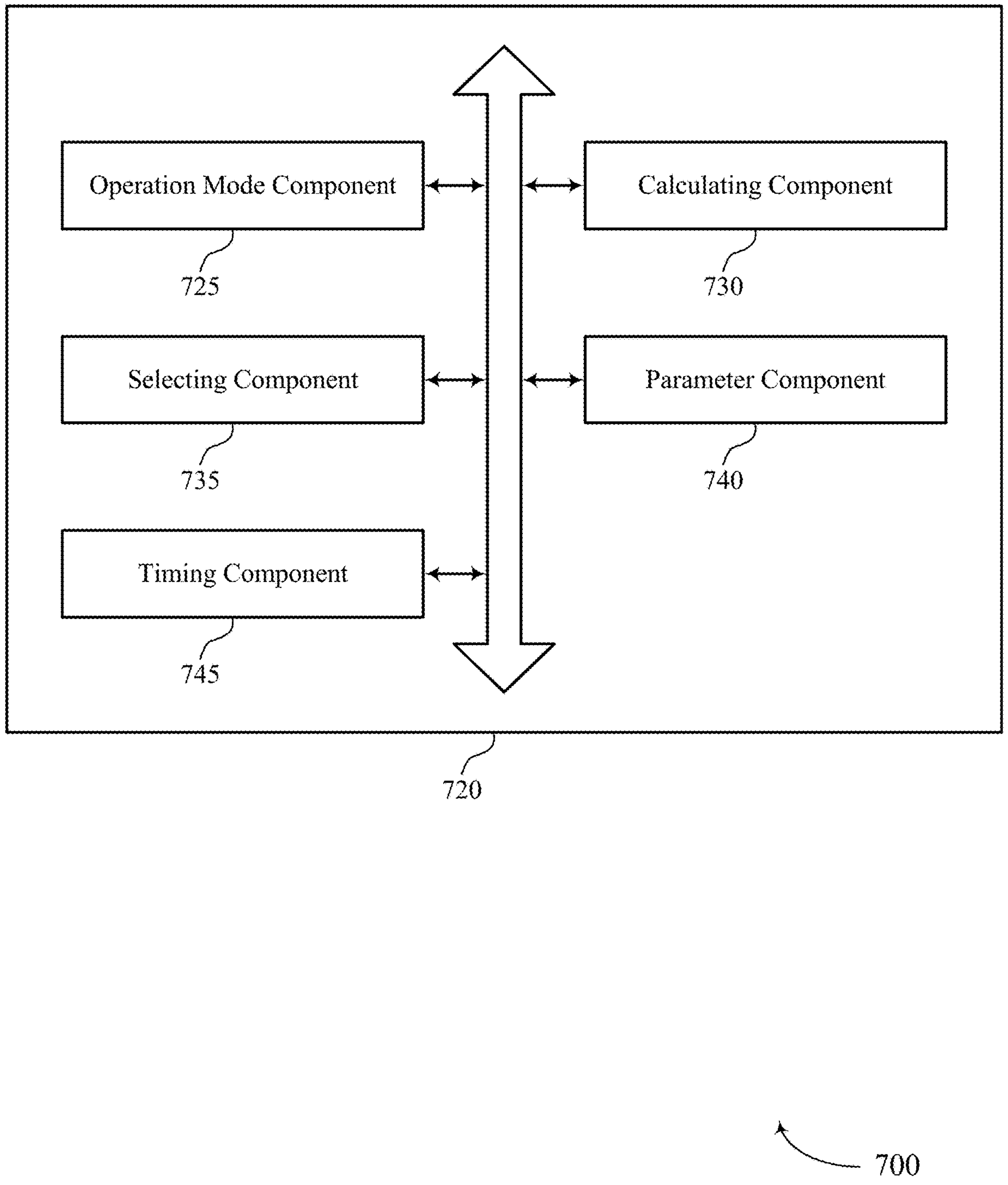
FIG. 7 shows a block diagram of a communications manager that supports mobility optimization for network energy saving in accordance with one or more aspects of the present disclosure.

FIG. 7 shows a block diagram 700 of a communications manager 720 that supports mobility optimization for network energy saving in accordance with one or more aspects of the present disclosure. The communications manager 720 may be an example of aspects of a communications manager 520, a communications manager 620, or both, as described herein. The communications manager 720, or various components thereof, may be an example of means for performing various aspects of mobility optimization for network energy saving as described herein. For example, the communications manager 720 may include an operation mode component 725, a calculating component 730, a selecting component 735, a parameter component 740, a timing component 745, or any combination thereof. Each of these components may communicate, directly or indirectly, with one another (e.g., via one or more buses).

The communications manager 720 may support wireless communications at a UE operating in an idle or inactive mode in accordance with examples as disclosed herein. The operation mode component 725 may be configured as or otherwise support a means for receiving an indication of an operation mode from among a set of multiple operation modes, where each network entity of a set of multiple network entities is associated with at least one operation mode of the set of multiple operation modes, the set of multiple operation modes including at least an energy saving mode and a baseline mode. The calculating component 730 may be configured as or otherwise support a means for calculating a set of values for each network entity of the set of multiple network entities based on the received indication and one or more parameters associated with the operation mode of a respective network entity. The selecting component 735 may be configured as or otherwise support a means for selecting a network entity from the set of multiple network entities based on each value of the set of values associated with the selected network entity being greater than one or more thresholds.

In some examples, to support selecting the network entity from the set of multiple network entities, the selecting component 735 may be configured as or otherwise support a means for selecting the network entity from the set of multiple network entities based on a first value of the set of values associated with the selected network entity and a second value of the set of values associated with the selected network entity being greater than a first threshold, where the first threshold is associated with a value of zero.

In some examples, to support selecting the network entity from the set of multiple network entities, the selecting component 735 may be configured as or otherwise support a means for selecting the network entity from the set of multiple network entities based on the set of values for the selected being within a first threshold, where the first threshold is associated with an offset from a largest value of the set of values for each network entity of the set of multiple network entities.

In some examples, to support calculating the set of values for each network entity of the set of multiple network entities, the calculating component 730 may be configured as or otherwise support a means for calculating a first value of the set of values for a network entity of the set of multiple network entities based on the received indication and a first subset of the one or more parameters, where the first value is associated with a reception level metric. In some examples, to support calculating the set of values for each network entity of the set of multiple network entities, the calculating component 730 may be configured as or otherwise support a means for calculating a second value of the set of values for a network entity of the set of multiple network entities based on the received indication and a second subset of the one or more parameters, where the second value is associated with a quality metric.

In some examples, to support calculating the set of values for each network entity of the set of multiple network entities, the calculating component 730 may be configured as or otherwise support a means for calculating a rank value for each network entity of the set of multiple network entities based on the received indication and one or more parameters associated with the operation mode of the respective network entity.

In some examples, the parameter component 740 may be configured as or otherwise support a means for receiving an indication of the one or more parameters associated with each operation mode from the set of multiple operation modes, including at least a first set of one or more parameters associated with the energy saving mode and second set of one or more parameters associated with the baseline mode.

In some examples, the one or more parameters associated with each operation mode from the set of multiple operation modes includes one or more parameters associated with a reception level of the respective network entity, one or more parameters associated with a quality of the respective network entity, one or more offset values, a compensation values, a hysteresis value, one or more cell reselection priority values, or any combination thereof.

In some examples, to support receiving the indication of the operation mode from the set of multiple operation modes, the operation mode component 725 may be configured as or otherwise support a means for receiving the indication of the operation mode from the set of multiple operation modes at a first frequency or a second frequency, where the first frequency is associated with the energy saving mode and the second frequency is associated with the baseline mode, and where selecting the network entity from the set of multiple network entities is based on the first frequency or the second frequency.

In some examples, to support receiving the indication of the operation mode from the set of multiple operation modes, the operation mode component 725 may be configured as or otherwise support a means for receiving a control message including the indication of the operation mode from the set of multiple operation modes.

In some examples, to support receiving the indication of the operation mode from the set of multiple operation modes, the timing component 745 may be configured as or otherwise support a means for receiving an indication of a timer associated with each operation mode from the set of multiple operation modes, where the indication of the operation mode is based on the timers associated with each operation mode.

In some examples, to support receiving the indication of the operation mode from the set of multiple operation modes, the operation mode component 725 may be configured as or otherwise support a means for receiving system information including the indication of the operation mode from the set of multiple operation modes.

In some examples, the set of multiple operation modes includes a compensation mode.

Figure 8:
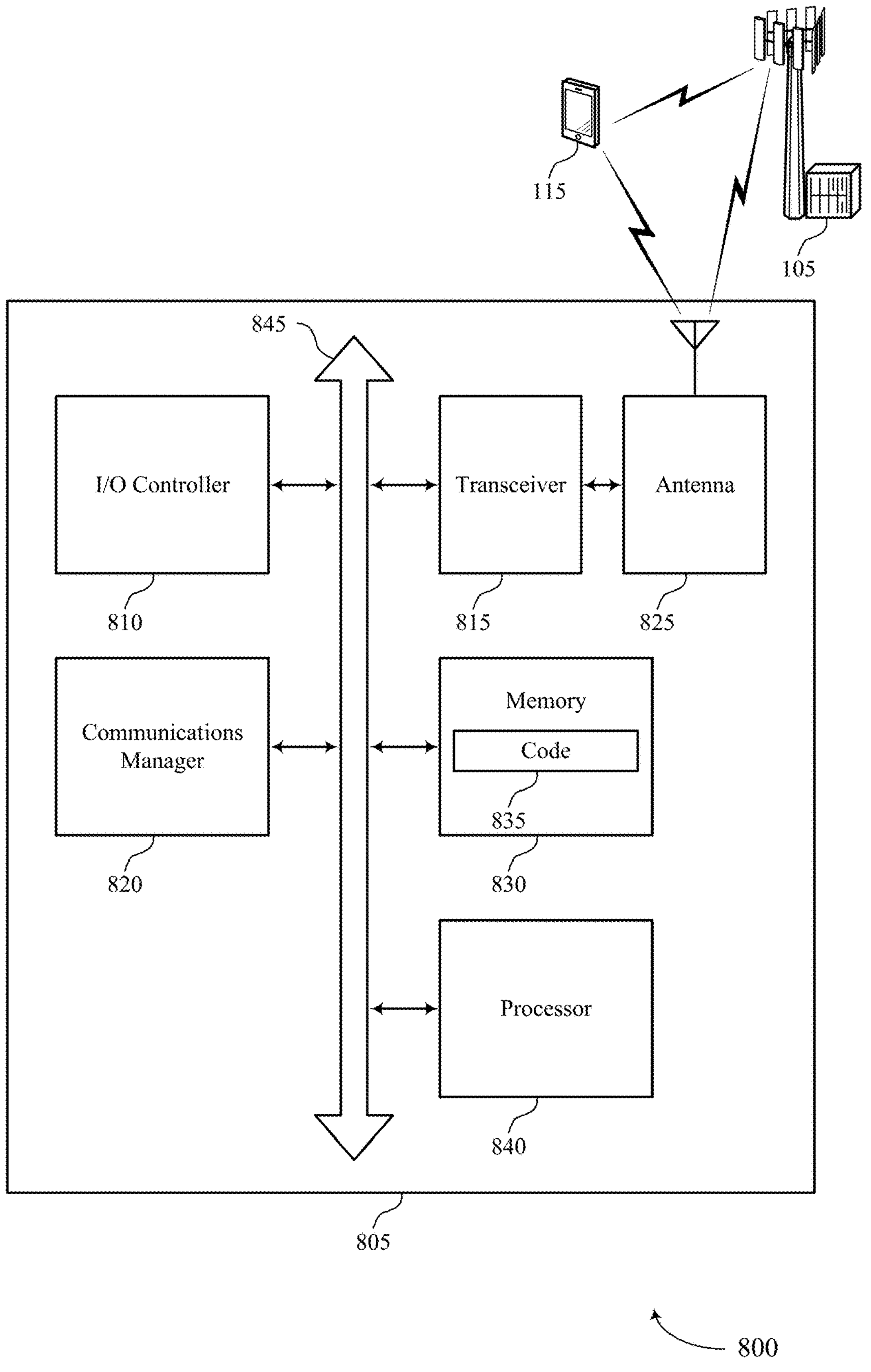
FIG. 8 shows a diagram of a system including a device that supports mobility optimization for network energy saving in accordance with one or more aspects of the present disclosure.

FIG. 8 shows a diagram of a system 800 including a device 805 that supports mobility optimization for network energy saving in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting mobility optimization for network energy saving). For example, the device 805 or a component of the device 805 may include a processor 840 and memory 830 coupled with or to the processor 840, the processor 840 and memory 830 configured to perform various functions described herein.

The communications manager 820 may support wireless communications at a UE operating in an idle or inactive mode in accordance with examples as disclosed herein. For example, the communications manager 820 may be configured as or otherwise support a means for receiving an indication of an operation mode from among a set of multiple operation modes, where each network entity of a set of multiple network entities is associated with at least one operation mode of the set of multiple operation modes, the set of multiple operation modes including at least an energy saving mode and a baseline mode. The communications manager 820 may be configured as or otherwise support a means for calculating a set of values for each network entity of the set of multiple network entities based on the received indication and one or more parameters associated with the operation mode of a respective network entity. The communications manager 820 may be configured as or otherwise support a means for selecting a network entity from the set of multiple network entities based on each value of the set of values associated with the selected network entity being greater than one or more thresholds.

By including or configuring the communications manager 820 in accordance with examples as described herein, the device 805 may support techniques for mobility optimization for network energy saving which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of mobility optimization for network energy saving as described herein, or the processor 840 and the memory 830 may be otherwise configured to perform or support such operations.

Figure 9:
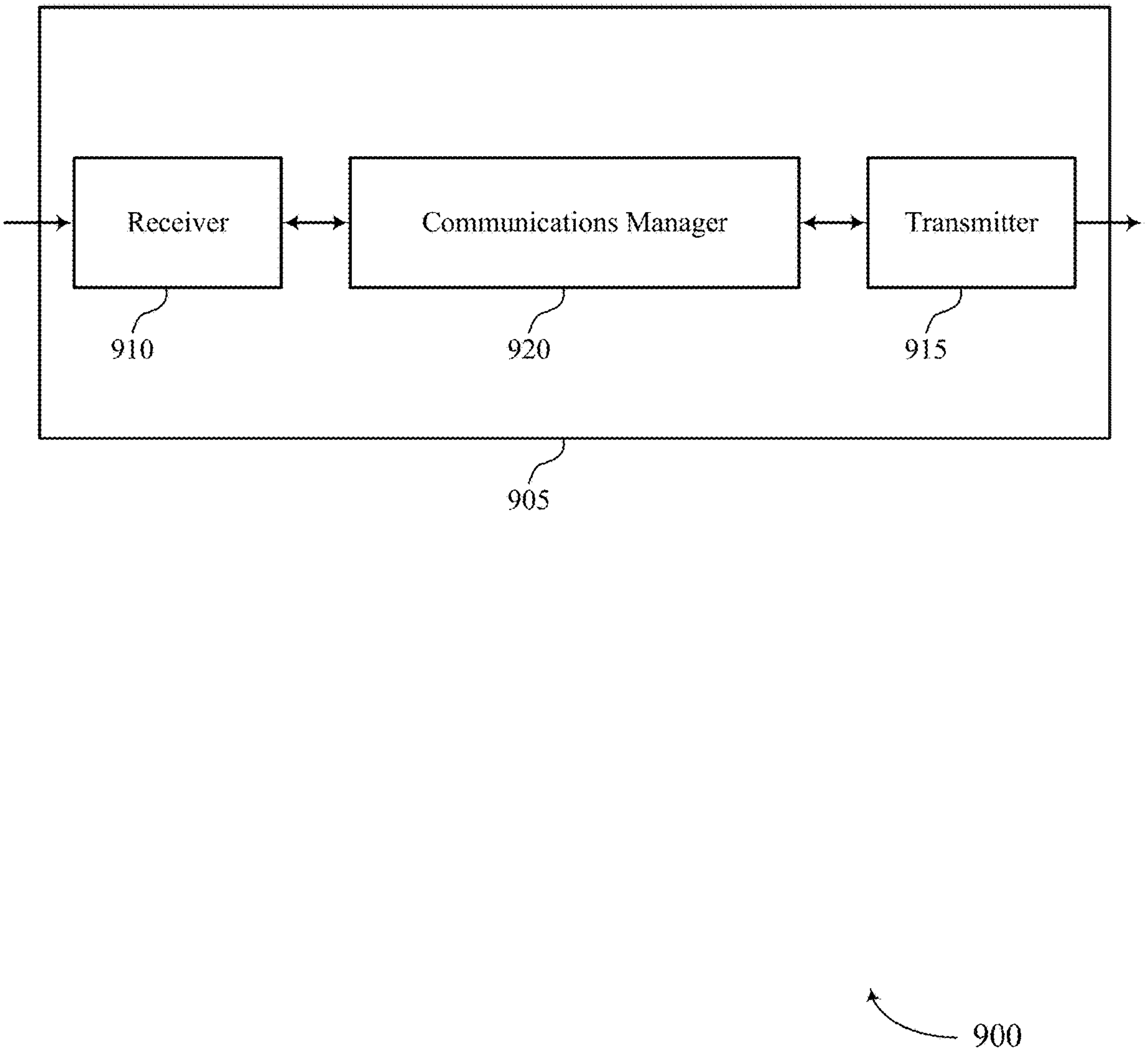
FIGS. 9 and 10 show block diagrams of devices that support mobility optimization for network energy saving in accordance with one or more aspects of the present disclosure.

FIG. 9 shows a block diagram 900 of a device 905 that supports mobility optimization for network energy saving in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of mobility optimization for network energy saving as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for communicating, via a backhaul communications link, an indication of a set of parameters associated with one or more operation modes from a set of multiple operation modes, the set of multiple operation modes including at least an energy saving mode and a baseline mode, and where the set of parameters is associated with the first network entity, a second network entity, or both.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for mobility optimization for network energy saving which may result in reduced processing, reduced power consumption, and more efficient utilization of communication resources, among other advantages.

Figure 10:
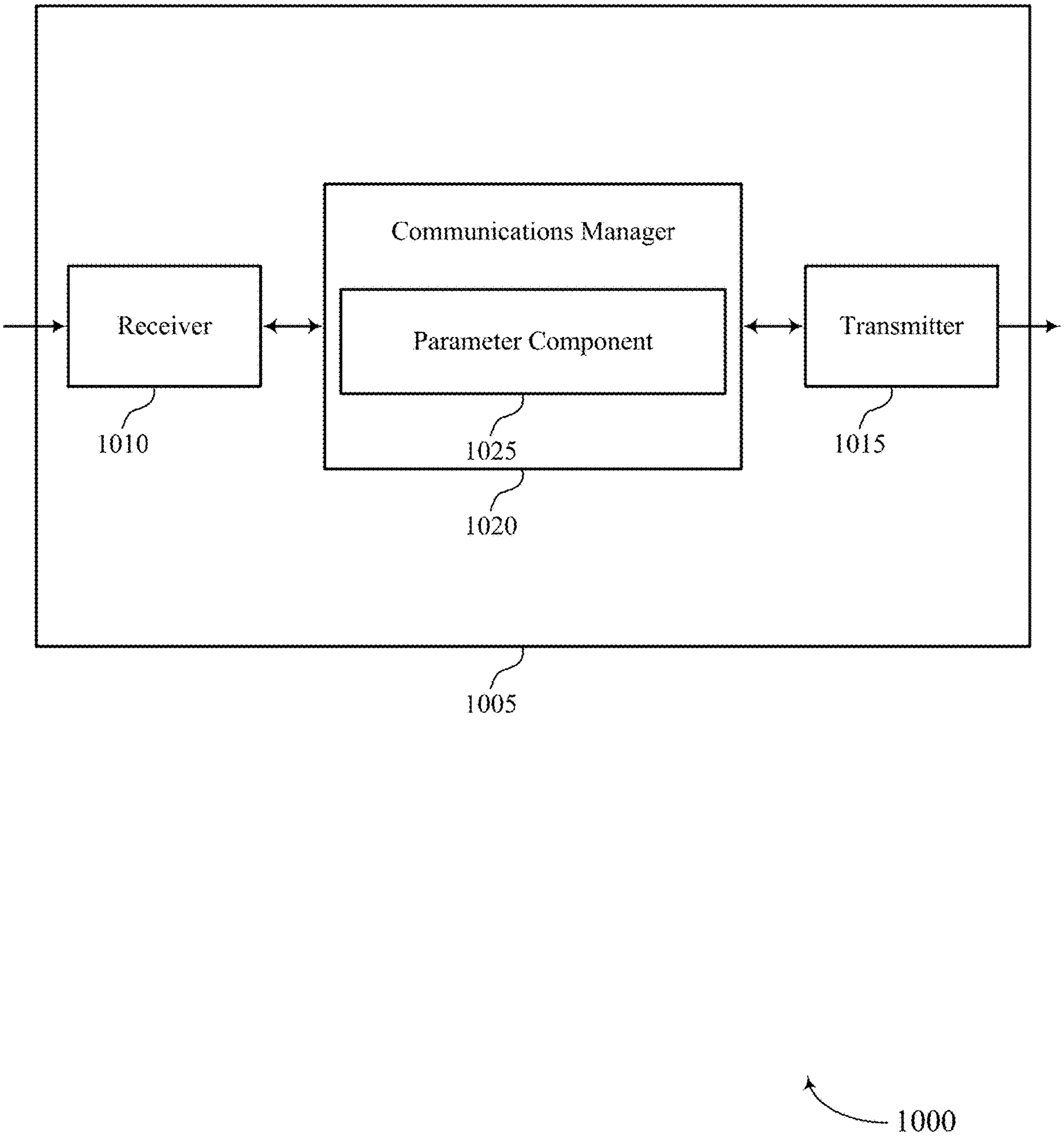

FIG. 10 shows a block diagram 1000 of a device 1005 that supports mobility optimization for network energy saving in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of mobility optimization for network energy saving as described herein. For example, the communications manager 1020 may include a parameter component 1025, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The parameter component 1025 may be configured as or otherwise support a means for communicating, via a backhaul communications link, an indication of a set of parameters associated with one or more operation modes from a set of multiple operation modes, the set of multiple operation modes including at least an energy saving mode and a baseline mode, and where the set of parameters is associated with the first network entity, a second network entity, or both.

Figure 11:
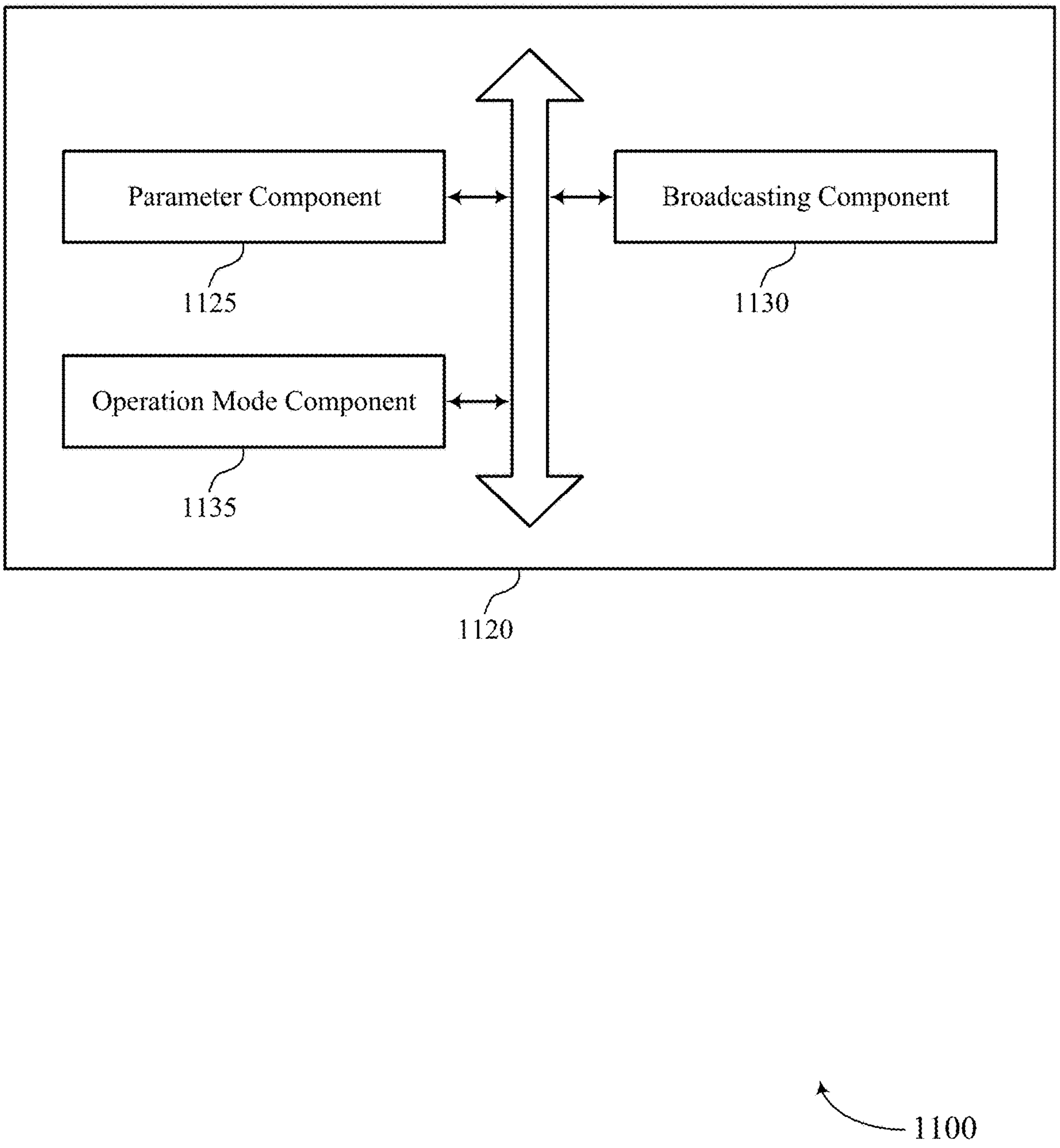
FIG. 11 shows a block diagram of a communications manager that supports mobility optimization for network energy saving in accordance with one or more aspects of the present disclosure.

FIG. 11 shows a block diagram 1100 of a communications manager 1120 that supports mobility optimization for network energy saving in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of mobility optimization for network energy saving as described herein. For example, the communications manager 1120 may include a parameter component 1125, a broadcasting component 1130, an operation mode component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The parameter component 1125 may be configured as or otherwise support a means for communicating, via a backhaul communications link, an indication of a set of parameters associated with one or more operation modes from a set of multiple operation modes, the set of multiple operation modes including at least an energy saving mode and a baseline mode, and where the set of parameters is associated with the first network entity, a second network entity, or both.

In some examples, the broadcasting component 1130 may be configured as or otherwise support a means for broadcasting an indication of the set of parameters.

In some examples, the operation mode component 1135 may be configured as or otherwise support a means for transmitting an indication of an operation mode from the set of multiple operation modes, where the operation mode is associated with the first network entity.

In some examples, the parameter component 1125 may be configured as or otherwise support a means for transmitting an indication of one or more parameters from the set of parameters, the one or more parameters being associated with the operation mode from the set of multiple operation modes and including at least a first set of one or more parameters associated with the energy saving mode or a second set of one or more parameters associated with the baseline mode.

In some examples, the one or more parameters associated with each operation mode from the set of multiple operation modes includes one or more parameters associated with a reception level of the respective network entity, one or more parameters associated with a quality of the respective network entity, one or more offset values, a compensation values, a hysteresis value, one or more cell reselection priority values, or any combination thereof.

In some examples, to support transmitting the indication of the operation mode from the set of multiple operation modes, the operation mode component 1135 may be configured as or otherwise support a means for transmitting the indication of the operation mode from the set of multiple operation modes at a first frequency or a second frequency, where the first frequency is associated with the energy saving mode and the second frequency is associated with the baseline mode.

In some examples, the operation mode component 1135 may be configured as or otherwise support a means for transmitting a control message including the indication of the operation mode from the set of multiple operation modes.

In some examples, transmitting an indication of a timer associated with each operation mode from the set of multiple operation modes, where the indication of the operation mode is based on the timers associated with each operation mode.

In some examples, to support transmitting the indication of the operation mode from the set of multiple operation modes, the operation mode component 1135 may be configured as or otherwise support a means for transmitting system information including the indication of the operation mode from the set of multiple operation modes.

In some examples, the set of multiple operation modes includes a compensation mode.

Figure 12:
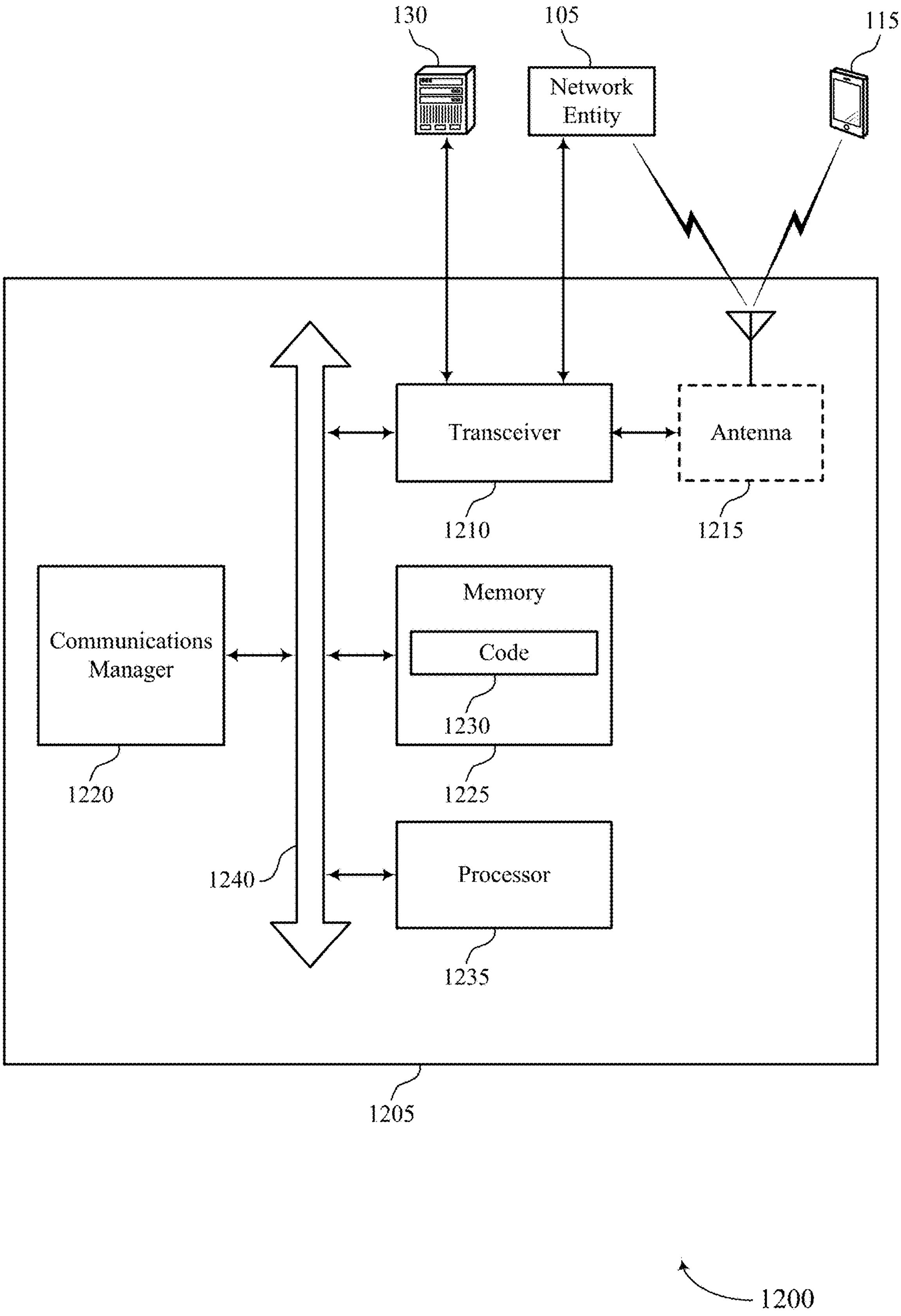
FIG. 12 shows a diagram of a system including a device that supports mobility optimization for network energy saving in accordance with one or more aspects of the present disclosure.

FIG. 12 shows a diagram of a system 1200 including a device 1205 that supports mobility optimization for network energy saving in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting mobility optimization for network energy saving). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for communicating, via a backhaul communications link, an indication of a set of parameters associated with one or more operation modes from a set of multiple operation modes, the set of multiple operation modes including at least an energy saving mode and a baseline mode, and where the set of parameters is associated with the first network entity, a second network entity, or both.

By including or configuring the communications manager 1220 in accordance with examples as described herein, the device 1205 may support techniques for mobility optimization for network energy saving which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of mobility optimization for network energy saving as described herein, or the processor 1235 and the memory 1225 may be otherwise configured to perform or support such operations.

Figure 13:
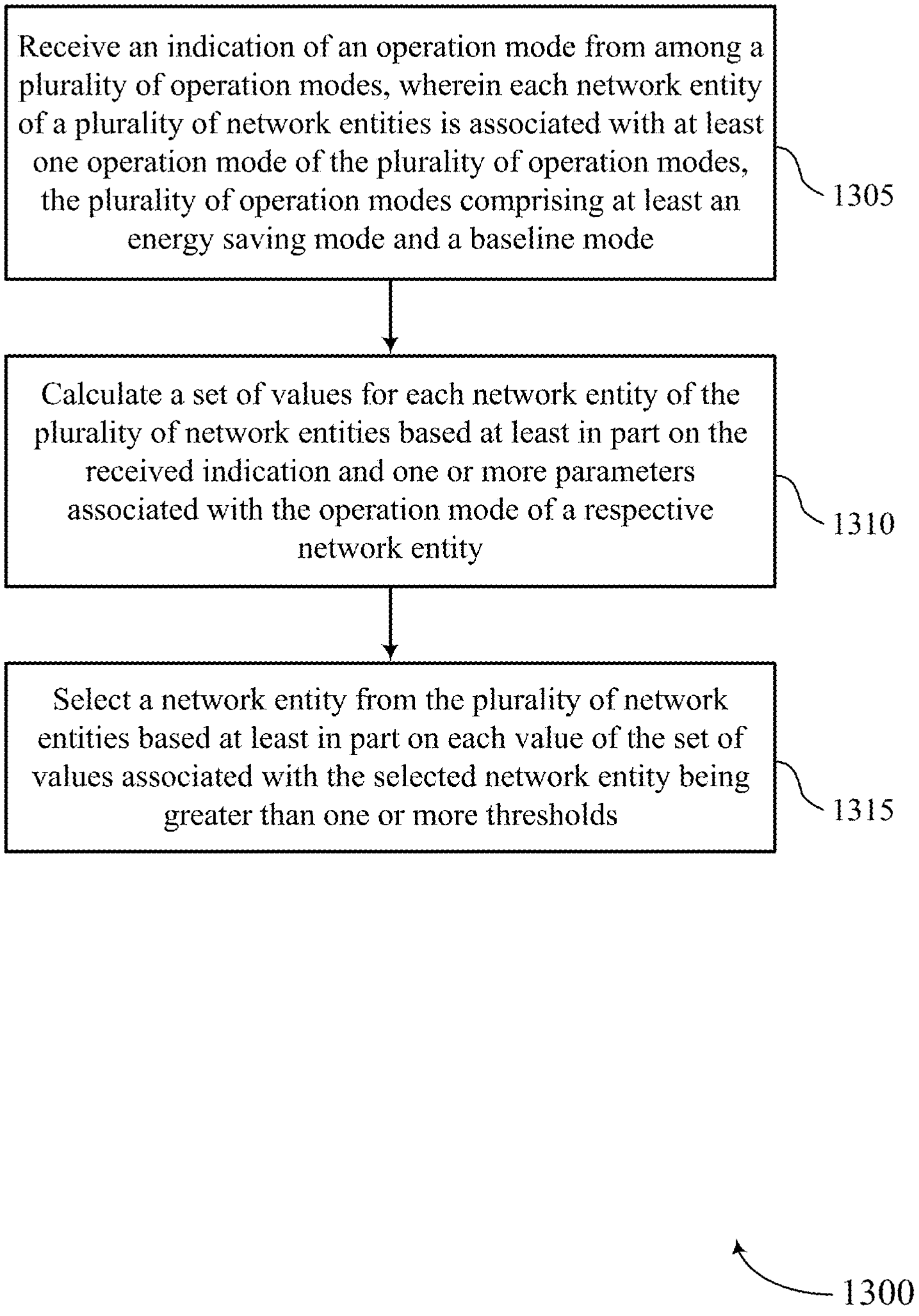
FIGS. 13 through 15 show flowcharts illustrating methods that support mobility optimization for network energy saving in accordance with one or more aspects of the present disclosure.

FIG. 13 shows a flowchart illustrating a method 1300 that supports mobility optimization for network energy saving in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an indication of an operation mode from among a set of multiple operation modes, where each network entity of a set of multiple network entities is associated with at least one operation mode of the set of multiple operation modes, the set of multiple operation modes including at least an energy saving mode and a baseline mode. The operations of 1305 may be performed in accordance with examples as disclosed herein. In some examples, aspects of the operations of 1305 may be performed by an operation mode component 725 as described with reference to FIG. 7.

At 1310, the method may include calculating a set of values for each network entity of the set of multiple network entities based on the received indication and one or more parameters associated with the operation mode of a respective network entity. The operations of 1310 may be performed in accordance with examples as disclosed herein. In some examples, aspects of the operations of 1310 may be performed by a calculating component 730 as described with reference to FIG. 7.

At 1315, the method may include selecting a network entity from the set of multiple network entities based on each value of the set of values associated with the selected network entity being greater than one or more thresholds. The operations of 1315 may be performed in accordance with examples as disclosed herein. In some examples, aspects of the operations of 1315 may be performed by a selecting component 735 as described with reference to FIG. 7.

Figure 14:
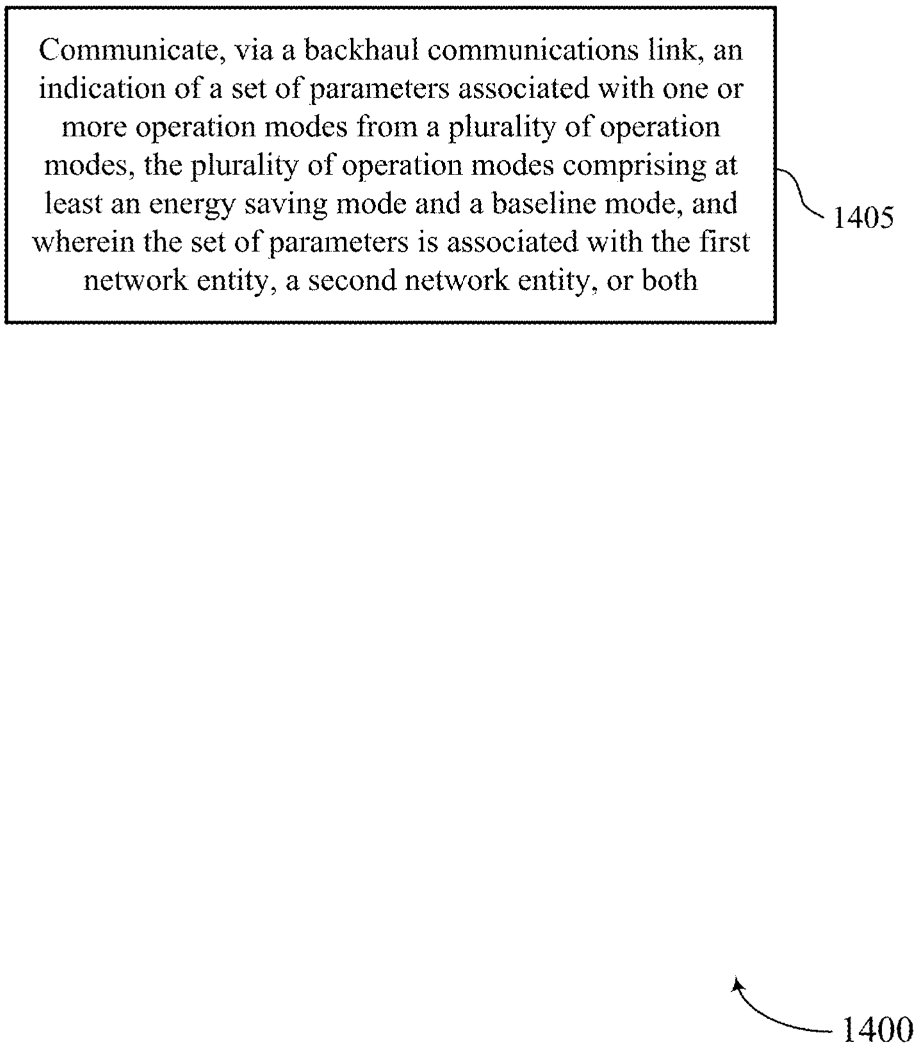

FIG. 14 shows a flowchart illustrating a method 1400 that supports mobility optimization for network energy saving in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include communicating, via a backhaul communication link, an indication of a set of parameters associated with one or more operation modes from a set of multiple operation modes, the set of multiple operation modes including at least an energy saving mode and a baseline mode, and where the set of parameters is associated with the first network entity, a second network entity, or both. The operations of 1405 may be performed in accordance with examples as disclosed herein. In some examples, aspects of the operations of 1405 may be performed by an operation mode component 1125 as described with reference to FIG. 11.

Figure 15:
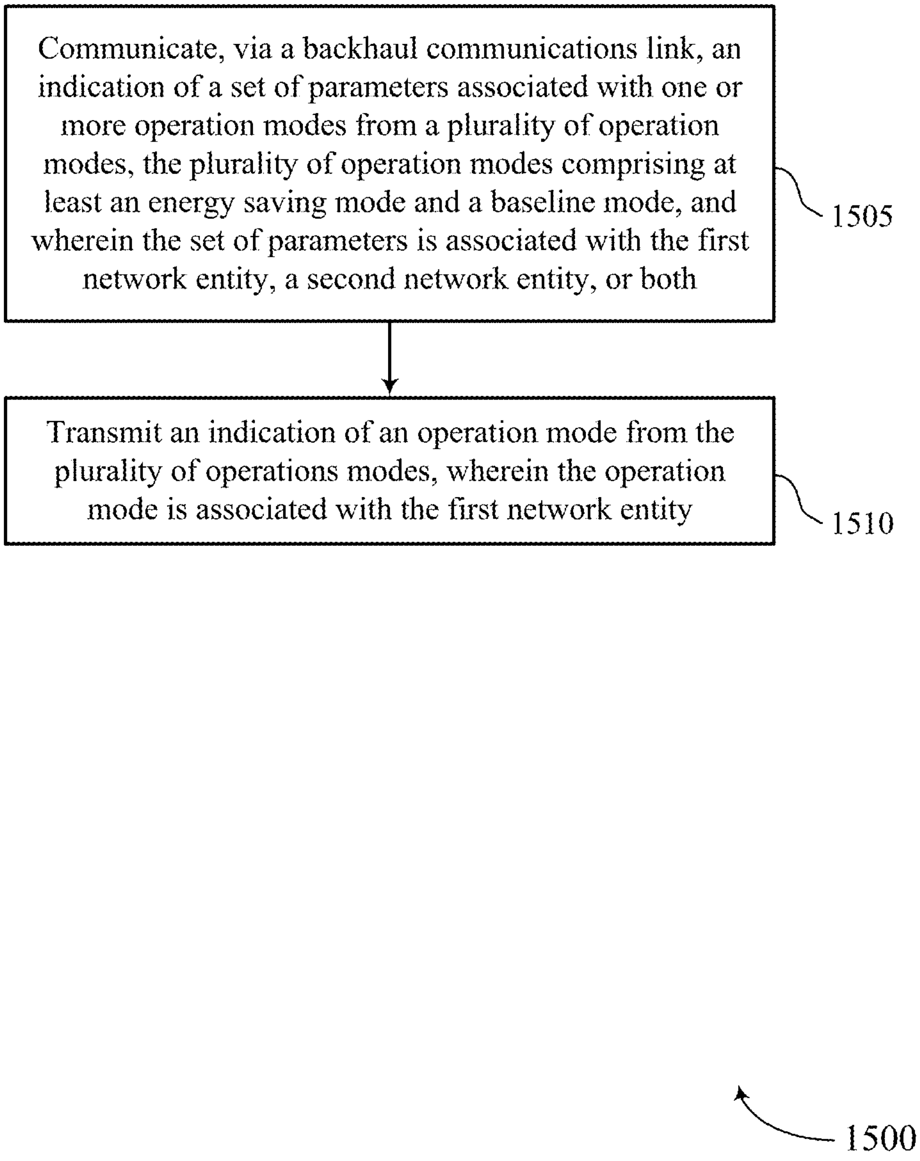

FIG. 15 shows a flowchart illustrating a method 1500 that supports mobility optimization for network energy saving in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include communicating, via a backhaul communications link, an indication of a set of parameters associated with one or more operation modes from a set of multiple operation modes, the set of multiple operation modes including at least an energy saving mode and a baseline mode, and wherein the set of parameters is associated with the first network entity, a second network entity, or both. The operations of 1505 may be performed in accordance with examples as disclosed herein. In some examples, aspects of the operations of 1505 may be performed by a parameter component 1125 as described with reference to FIG. 11.

At 1510, the method may include transmitting an indication of an operation mode from the set of multiple operation modes, where the operation mode is associated with a first network entity. The operations of 1510 may be performed in accordance with examples as disclosed herein. In some examples, aspects of the operations of 1510 may be performed by a broadcasting component 1135 as described with reference to FIG. 11.

The following provides an overview of aspects of the present disclosure:

Aspect 1: A method for wireless communications at a UE operating in an idle or inactive mode, comprising: receiving an indication of an operation mode from among a plurality of operation modes, wherein each network entity of a plurality of network entities is associated with at least one operation mode of the plurality of operation modes, the plurality of operation modes comprising at least an energy saving mode and a baseline mode; calculating a set of values for each network entity of the plurality of network entities based at least in part on the received indication and one or more parameters associated with the operation mode of a respective network entity; and selecting a network entity from the plurality of network entities based at least in part on each value of the set of values associated with the selected network entity being greater than one or more thresholds.

Aspect 2: The method of aspect 1, wherein selecting the network entity from the plurality of network entities comprises: selecting the network entity from the plurality of network entities based at least in part on a first value of the set of values associated with the selected network entity and a second value of the set of values associated with the selected network entity being greater than a first threshold, wherein the first threshold is associated with a value of zero.

Aspect 3: The method of any of aspects 1 through 2, wherein selecting the network entity from the plurality of network entities comprises: selecting the network entity from the plurality of network entities based at least in part on the set of values for the selected being within a first threshold, wherein the first threshold is associated with an offset from a largest value of the set of values for each network entity of the plurality of network entities.

Aspect 4: The method of any of aspects 1 through 3, wherein calculating the set of values for each network entity of the plurality of network entities comprises: calculating a first value of the set of values for a network entity of the plurality of network entities based at least in part on the received indication and a first subset of the one or more parameters, wherein the first value is associated with a reception level metric; and calculating a second value of the set of values for a network entity of the plurality of network entities based at least in part on the received indication and a second subset of the one or more parameters, wherein the second value is associated with a quality metric.

Aspect 5: The method of any of aspects 1 through 4, wherein calculating the set of values for each network entity of the plurality of network entities comprises: calculating a rank value for each network entity of the plurality of network entities based at least in part on the received indication and one or more parameters associated with the operation mode of the respective network entity.

Aspect 6: The method of any of aspects 1 through 5, further comprising: receiving an indication of the one or more parameters associated with each operation mode from the plurality of operation modes, including at least a first set of one or more parameters associated with the energy saving mode and second set of one or more parameters associated with the baseline mode.

Aspect 7: The method of any of aspects 1 through 6, wherein the one or more parameters associated with each operation mode from the plurality of operation modes comprises one or more parameters associated with a reception level of the respective network entity, one or more parameters associated with a quality of the respective network entity, one or more offset values, a compensation values, a hysteresis value, one or more cell reselection priority values, or any combination thereof.

Aspect 8: The method of any of aspects 1 through 7, wherein receiving the indication of the operation mode from the plurality of operation modes comprises: receiving the indication of the operation mode from the plurality of operation modes at a first frequency or a second frequency, wherein the first frequency is associated with the energy saving mode and the second frequency is associated with the baseline mode, and wherein selecting the network entity from the plurality of network entities is based at least in part on the first frequency or the second frequency.

Aspect 9: The method of any of aspects 1 through 8, wherein receiving the indication of the operation mode from the plurality of operation modes comprises: receiving a control message comprising the indication of the operation mode from the plurality of operation modes.

Aspect 10: The method of aspect 9, wherein receiving the indication of the operation mode from the plurality of operation modes comprises: receiving an indication of a timer associated with each operation mode from the plurality of operation modes, wherein the indication of the operation mode is based at least in part on the timers associated with each operation mode.

Aspect 11: The method of any of aspects 1 through 10, wherein receiving the indication of the operation mode from the plurality of operation modes comprises: receiving system information comprising the indication of the operation mode from the plurality of operation modes.

Aspect 12: The method of any of aspects 1 through 11, wherein the plurality of operation modes comprises a compensation mode.

Aspect 13: A method for wireless communications at a first network entity, comprising: communicating, via a backhaul communications link, an indication of a set of parameters associated with one or more operation modes from a plurality of operation modes, the plurality of operation modes comprising at least an energy saving mode and a baseline mode, and wherein the set of parameters is associated with the first network entity, a second network entity, or both.

Aspect 14: The method of aspect 13, further comprising: broadcasting an indication of the set of parameters.

Aspect 15: The method of any of aspects 13 through 14, further comprising: transmitting an indication of an operation mode from the plurality of operation mode, wherein the operation mode is associated with the first network entity.

Aspect 16: The method of aspect 15, further comprising: transmitting an indication of one or more parameters from the set of parameters, the one or more parameters being associated with the operation mode from the plurality of operation modes and including at least a first set of one or more parameters associated with the energy saving mode or a second set of one or more parameters associated with the baseline mode.

Aspect 17: The method of aspect 16, wherein the one or more parameters associated with each operation mode from the plurality of operation modes comprises one or more parameters associated with a reception level of the respective network entity, one or more parameters associated with a quality of the respective network entity, one or more offset values, a compensation values, a hysteresis value, one or more cell reselection priority values, or any combination thereof.

Aspect 18: The method of any of aspects 15 through 17, wherein transmitting the indication of the operation mode from the plurality of operation modes comprises: transmitting the indication of the operation mode from the plurality of operation modes at a first frequency or a second frequency, wherein the first frequency is associated with the energy saving mode and the second frequency is associated with the baseline mode.

Aspect 19: The method of any of aspects 15 through 18, transmitting the indication of the operation mode from the plurality of operation modes comprises: transmitting a control message comprising the indication of the operation mode from the plurality of operation modes.

Aspect 20: The method of any of aspects 15 through 19, transmitting the indication of the operation mode from the plurality of operation modes comprises transmitting an indication of a timer associated with each operation mode from the plurality of operation modes, wherein the indication of the operation mode is based at least in part on the timers associated with each operation mode.

Aspect 21: The method of any of aspects 15 through 20, wherein transmitting the indication of the operation mode from the plurality of operation modes comprises: transmitting system information comprising the indication of the operation mode from the plurality of operation modes.

Aspect 22: The method of any of aspects 13 through 21, wherein the plurality of operation modes comprises a compensation mode.

Aspect 23: An apparatus for wireless communications at a UE operating in an idle or inactive mode, comprising a processor; memory coupled with the processor; and instructions stored in the memory and executable by the processor to cause the apparatus to perform a method of any of aspects 1 through 12.

Aspect 24: An apparatus for wireless communications at a UE operating in an idle or inactive mode, comprising at least one means for performing a method of any of aspects 1 through 12.

Aspect 25: A non-transitory computer-readable medium storing code for wireless communications at a UE operating in an idle or inactive mode, the code comprising instructions executable by a processor to perform a method of any of aspects 1 through 12.

Aspect 26: An apparatus for wireless communications at a first network entity, comprising a processor; memory coupled with the processor; and instructions stored in the memory and executable by the processor to cause the apparatus to perform a method of any of aspects 13 through 22.

Aspect 27: An apparatus for wireless communications at a first network entity, comprising at least one means for performing a method of any of aspects 13 through 22.

Aspect 28: A non-transitory computer-readable medium storing code for wireless communications at a first network entity, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE) operating in an idle or inactive mode, comprising:

a processing system that includes processor circuitry and memory circuitry that stores code, the processing system configured to cause the apparatus to:

receive a control message indicative of a configuration of a plurality of sets of parameters associated with a plurality of operation modes, the plurality of sets of parameters comprising at least a first set of parameters associated with an energy saving mode from the plurality of operation modes and a second set of parameters associated with a baseline mode associated from the plurality of operation modes, wherein the first set of parameters associated with the energy saving mode comprises at least a first offset value and the second set of parameters associated with the baseline mode comprises at least a second offset value;

receive, from a network entity, a message at a first frequency or a second frequency, wherein the first frequency is associated with the energy saving mode and the second frequency is associated with the baseline mode;

calculate a set of values for the network entity based at least in part on selection, by the UE, of the first set of parameters and the first offset value or the second set of parameters and the second offset value in accordance with whether the message was received at the first frequency or the second frequency; and select the network entity from a plurality of network entities based at least in part on each value of the set of values associated with the network entity being greater than one or more thresholds.

2. The apparatus of claim 1, wherein, to select the network entity from the plurality of network entities, the processing system is configured to cause the apparatus to:

select the network entity from the plurality of network entities based at least in part on a first value of the set of values associated with the network entity and a second value of the set of values associated with the network entity being greater than a first threshold, wherein the first threshold is associated with a value of zero.

3. The apparatus of claim 1, wherein, to select the network entity from the plurality of network entities, the processing system is configured to cause the apparatus to:

select the network entity from the plurality of network entities based at least in part on the set of values for the network entity being within a first threshold, wherein the first threshold is associated with the first offset or the second offset value from a largest value of the set of values for each network entity of the plurality of network entities.

4. The apparatus of claim 1, wherein an operation mode of the network entity is in accordance with whether the message was received at the first frequency or the second frequency, and wherein, to calculate the set of values for the network entity, the processing system is configured to cause the apparatus to:

calculate a first value of the set of values based at least in part on the operation mode and a first subset of one or more parameters, wherein the first value is associated with a reception level metric; and calculate a second value of the set of values based at least in part on the operation mode and a second subset of the one or more parameters, wherein the second value is associated with a quality metric.

5. The apparatus of claim 1, wherein an operation mode of the network entity is in accordance with whether the message was received at the first frequency or the second frequency, and wherein, to calculate the set of values for the network entity, the processing system is configured to cause the apparatus to:

calculate a rank value for the network entity based at least in part on the operation mode and one or more parameters associated with the operation mode of the network entity.

6. The apparatus of claim 1, wherein each of the first set of parameters and the second set of parameters comprises a compensation value, a hysteresis value, one or more cell reselection priority values, or any combination thereof.

7. The apparatus of claim 1, wherein the first set of parameters comprises a first threshold quality metric, a first threshold reception level metric, or both, associated with the energy saving mode, the second set of parameters comprises a second threshold quality metric, a second threshold reception level metric, or both, associated with the baseline mode, the first threshold quality metric different than the second threshold quality metric, and the first threshold reception level metric different than the second threshold reception level metric.

8. The apparatus of claim 1, wherein the message comprises a control message that indicates information that indicates an operation mode from the plurality of operation modes.

9. The apparatus of claim 1, wherein the processing system is further configured to cause the apparatus to:

receive an indication of a respective timer associated with each operation mode from the plurality of operation modes, wherein an operation mode of the network entity is based at least in part on the timers associated with the plurality of operation modes.

10. The apparatus of claim 1, wherein the message comprises system information that indicates an operation mode from the plurality of operation modes.

11. The apparatus of claim 1, wherein the plurality of operation modes comprises a compensation mode.

12. An apparatus for wireless communications at a first network entity, comprising:

a processing system that includes processor circuitry and memory circuitry that stores code, the processing system configured to cause the apparatus to:

communicate, via a backhaul communications link, one or more indications of a plurality of sets of parameters associated with a plurality of operation modes, the plurality of operation modes comprising at least an energy saving mode associated with a first set of parameters from the plurality of sets of parameters and a baseline mode associated with a second set of parameters from the plurality of sets of parameters, wherein the plurality of sets of parameters are associated with the first network entity, a second network entity, or both, and wherein the first set of parameters associated with the energy saving mode comprises at least a first offset value and the second set of parameters associated with the baseline mode comprises at least a second offset value;

transmit, to a user equipment (UE), a control message indicative of a configuration of the plurality of sets of parameters associated with the plurality of operation modes based at least in part on communication of the one or more indications via the backhaul communications link; and transmit, to the UE, a message at a first frequency or a second frequency, wherein the first frequency is associated with the energy saving mode and the second frequency is associated with the baseline mode, and wherein an operation mode of the first network entity is in accordance with whether the message is transmitted at the first frequency or the second frequency.

13. The apparatus of claim 12, wherein the processing system is further configured to cause the apparatus to:

transmit, via the message, an indication of the operation mode from the plurality of operation modes, wherein the operation mode is associated with the first network entity.

14. The apparatus of claim 12, wherein each of the first set of parameters and the second set of parameters comprises a compensation value, a hysteresis value, one or more cell reselection priority values, or any combination thereof.

15. The apparatus of claim 13, wherein the first set of parameters comprises a first threshold quality metric, a first threshold reception level metric, or both, associated with the energy saving mode, the second set of parameters comprises a second threshold quality metric, a second threshold reception level metric, or both, associated with the baseline mode, the first threshold quality metric different than the second threshold quality metric, and the first threshold reception level metric different than the second threshold reception level metric.

16. The apparatus of claim 13, wherein, to transmit the indication of the operation mode from the plurality of operation modes, the processing system is configured to cause the apparatus to:

transmit a control message comprising the indication of the operation mode from the plurality of operation modes.

17. The apparatus of claim 13, wherein, to transmit the indication of the operation mode from the plurality of operation modes, the processing system is configured to cause the apparatus to:

transmit an indication of a respective timer associated with each operation mode from the plurality of operation modes, wherein the indication of the operation mode is based at least in part on the timers associated with the plurality of operation modes.

18. The apparatus of claim 13, wherein, to transmit the indication of the operation mode from the plurality of operation modes, the processing system is configured to cause the apparatus to:

transmit system information comprising the indication of the operation mode from the plurality of operation modes.

19. The apparatus of claim 12, wherein the plurality of operation modes comprises a compensation mode.

20. A method for wireless communications at a user equipment (UE) operating in an idle or inactive mode, comprising:

receiving a control message indicative of a configuration of a plurality of sets of parameters associated with a plurality of operation modes, the plurality of sets of parameters comprising at least a first set of parameters associated with an energy saving mode from the plurality of operation modes and a second set of parameters associated with a baseline mode associated from the plurality of operation modes, wherein the first set of parameters associated with the energy saving mode comprises at least a first offset value and the second set of parameters associated with the baseline mode comprises at least a second offset value;

receiving, from a network entity, a message at a first frequency or a second frequency, wherein the first frequency is associated with the energy saving mode and the second frequency is associated with the baseline mode;

calculating a set of values for the network entity based at least in part on selection, by the UE, of the first set of parameters and the first offset value or the second set of parameters and the second offset value in accordance with whether the message was received at the first frequency or the second frequency; and selecting the network entity from a plurality of network entities based at least in part on each value of the set of values associated with the network entity being greater than one or more thresholds.

21. The method of claim 20, wherein selecting the network entity from the plurality of network entities comprises:

selecting the network entity from the plurality of network entities based at least in part on a first value of the set of values associated with the network entity and a second value of the set of values associated with the network entity being greater than a first threshold, wherein the first threshold is associated with a value of zero.

22. The method of claim 20, wherein selecting the network entity from the plurality of network entities comprises:

selecting the network entity from the plurality of network entities based at least in part on the set of values for the network entity being within a first threshold, wherein the first threshold is associated with the first offset value or the second offset value from a largest value of the set of values for each network entity of the plurality of network entities.

23. The method of claim 20, wherein an operation mode of the network entity is in accordance with whether the message was received at the first frequency or the second frequency, and wherein calculating the set of values for the network entity comprises:

calculating a first value of the set of values based at least in part on the operation mode and a first subset of one or more parameters, wherein the first value is associated with a reception level metric; and calculating a second value of the set of values based at least in part on the operation mode and a second subset of the one or more parameters, wherein the second value is associated with a quality metric.

24. The method of claim 20, wherein an operation mode of the network entity is in accordance with whether the message was received at the first frequency or the second frequency, and wherein calculating the set of values for the network entity comprises:

calculating a rank value for the network entity based at least in part on the operation mode and one or more parameters associated with the operation mode of the network entity.

25. The method of claim 20, wherein the plurality of operation modes comprises a compensation mode.

26. A method for wireless communications at a first network entity, comprising:

communicating, via a backhaul communications link, one or more indications of a plurality of sets of parameters associated with a plurality of operation modes, the plurality of operation modes comprising at least an energy saving mode associated with a first set of parameters from the plurality of sets of parameters and a baseline mode associated with a second set of parameters from the plurality of sets of parameters, wherein the plurality of sets of parameters are associated with the first network entity, a second network entity, or both, and wherein the first set of parameters associated with the energy saving mode comprises at least a first offset value and the second set of parameters associated with the baseline mode comprises at least a second offset value;

transmitting, to a user equipment (UE), a control message indicative of a configuration of the plurality of sets of parameters associated with the plurality of operation modes based at least in part on communication of the one or more indications via the backhaul communications link; and transmitting, to the UE, a message at a first frequency or a second frequency, wherein the first frequency is associated with the energy saving mode and the second frequency is associated with the baseline mode, and wherein an operation mode of the first network entity is in accordance with whether the message is transmitted at the first frequency or the second frequency.

* * * * *